United States Patent
Goldstein et al.

(10) Patent No.: US 9,229,986 B2
(45) Date of Patent: Jan. 5, 2016

(54) RECURSIVE PROCESSING IN STREAMING QUERIES

(75) Inventors: Jonathan D. Goldstein, Kirkland, WA (US); David E. Maier, Portland, OR (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/298,159

(22) Filed: Nov. 16, 2011

(65) Prior Publication Data

US 2012/0084322 A1    Apr. 5, 2012

Related U.S. Application Data

(62) Division of application No. 12/246,509, filed on Oct. 7, 2008, now abandoned.

(51) Int. Cl.
G06F 17/30    (2006.01)

(52) U.S. Cl.
CPC .................. *G06F 17/30516* (2013.01)

(58) Field of Classification Search
CPC ............ G06F 17/30513; G06F 17/30516
USPC ......................................................... 707/773
See application file for complete search history.

(56) References Cited

U.S. PATENT DOCUMENTS

| | | | |
|---|---|---|---|
| 5,321,837 A | 6/1994 | Daniel et al. | |
| 5,528,516 A | 6/1996 | Yemini et al. | |
| 5,546,570 A * | 8/1996 | McPherson et al. | 707/773 |
| 5,691,917 A * | 11/1997 | Harrison | 717/127 |
| 5,765,037 A | 6/1998 | Morrison et al. | |
| 5,805,782 A | 9/1998 | Foran | |
| 5,809,235 A | 9/1998 | Sharma et al. | |
| 5,891,046 A | 4/1999 | Cyrus | |
| 5,999,908 A | 12/1999 | Abelow | |
| 6,145,009 A | 11/2000 | Miyazawa et al. | |
| 6,236,998 B1 | 5/2001 | Lehtinen | |
| 6,253,313 B1 | 6/2001 | Morrison et al. | |
| 6,327,587 B1 * | 12/2001 | Forster | 1/1 |
| 6,336,139 B1 | 1/2002 | Feridun | |
| 6,449,618 B1 | 9/2002 | Blott et al. | |
| 6,477,562 B2 | 11/2002 | Nemirovsky | |
| 6,484,203 B1 | 11/2002 | Porras | |
| 6,496,831 B1 | 12/2002 | Baulier | |

(Continued)

FOREIGN PATENT DOCUMENTS

JP    11-259578    9/1999
JP    2003-308333    10/2003

(Continued)

OTHER PUBLICATIONS

Barga et al. "Coping with Variable Latency and Disorder in Distributed Event Streams," IEEE (2006).*

(Continued)

*Primary Examiner* — James Trujillo
*Assistant Examiner* — Hubert Cheung
(74) *Attorney, Agent, or Firm* — Alin Corie; Sandy Swain; Micky Minhas

(57) ABSTRACT

The described implementations relate to recursive streaming queries. One technique processes a recursive streaming query through a query graph. The technique also detects when output produced by executing the query graph advances to a specific point.

20 Claims, 6 Drawing Sheets

(56) References Cited

U.S. PATENT DOCUMENTS

| | | | |
|---|---|---|---|
| 6,507,840 B1 | 1/2003 | Ioannidis | |
| 6,601,058 B2* | 7/2003 | Forster et al. | 1/1 |
| 6,604,102 B2 | 8/2003 | Klein et al. | |
| 6,629,106 B1 | 9/2003 | Narayanaswarny et al. | |
| 6,633,910 B1 | 10/2003 | Rajan | |
| 6,681,230 B1 | 1/2004 | Blott et al. | |
| 6,763,353 B2 | 7/2004 | Li | |
| 6,775,658 B1 | 8/2004 | Zothner | |
| 6,782,379 B2 | 8/2004 | Lee | |
| 6,920,468 B1 | 7/2005 | Cousins et al. | |
| 6,925,631 B2 | 8/2005 | Golden | |
| 6,941,557 B1 | 9/2005 | Jakobson | |
| 6,954,757 B2 | 10/2005 | Zargham | |
| 7,013,289 B2 | 3/2006 | Horn | |
| 7,020,618 B1 | 3/2006 | Ward | |
| 7,028,324 B2 | 4/2006 | Shimizu | |
| 7,065,561 B2 | 6/2006 | Fry et al. | |
| 7,065,566 B2 | 6/2006 | Menard | |
| 7,103,556 B2 | 9/2006 | Del Rey | |
| 7,107,224 B1 | 9/2006 | Weller | |
| 7,310,638 B1* | 12/2007 | Blair | 1/1 |
| 7,349,675 B2 | 3/2008 | Karr et al. | |
| 7,349,925 B2 | 3/2008 | Cherkauer et al. | |
| 7,383,255 B2 | 6/2008 | Desai | |
| 7,409,428 B1 | 8/2008 | Brabec et al. | |
| 7,457,728 B2 | 11/2008 | Chen et al. | |
| 7,467,018 B1 | 12/2008 | Callaghan | |
| 7,523,190 B1 | 4/2009 | Bickerstaff et al. | |
| 7,525,646 B1* | 4/2009 | Sullivan et al. | 355/77 |
| 7,590,644 B2 | 9/2009 | Matsakis | |
| 7,657,540 B1 | 2/2010 | Bayliss | |
| 7,676,461 B2 | 3/2010 | Chkodrov et al. | |
| 7,702,689 B2* | 4/2010 | Forstmann et al. | 707/773 |
| 7,840,592 B2* | 11/2010 | Muras | 707/769 |
| 7,890,923 B2 | 2/2011 | Elaasar | |
| 7,996,388 B2 | 8/2011 | Jain | |
| 8,019,390 B2 | 9/2011 | Sindhu | |
| 8,060,614 B2* | 11/2011 | Goldstein et al. | 709/226 |
| 8,224,805 B2 | 7/2012 | Lee | |
| 8,291,005 B2* | 10/2012 | Lang et al. | 709/201 |
| 8,296,331 B2 | 10/2012 | Chkodrov et al. | |
| 8,296,434 B1 | 10/2012 | Miller | |
| 8,315,990 B2* | 11/2012 | Barga et al. | 707/690 |
| 8,447,859 B2 | 5/2013 | Bobak | |
| 8,775,482 B2 | 7/2014 | Chkodrov et al. | |
| 2002/0016771 A1 | 2/2002 | Carothers | |
| 2002/0032676 A1 | 3/2002 | Reiner | |
| 2002/0059183 A1 | 5/2002 | Chen | |
| 2002/0062237 A1 | 5/2002 | Matsumoto | |
| 2002/0083049 A1* | 6/2002 | Forster et al. | 707/3 |
| 2002/0099578 A1 | 7/2002 | Eicher, Jr. | |
| 2002/0129024 A1 | 9/2002 | Lee | |
| 2003/0120450 A1 | 6/2003 | Ernst | |
| 2003/0163465 A1 | 8/2003 | Morrill | |
| 2003/0181991 A1 | 9/2003 | Chau | |
| 2003/0236677 A1 | 12/2003 | Casati | |
| 2004/0068428 A1 | 4/2004 | Mitchell | |
| 2004/0098390 A1 | 5/2004 | Bayliss | |
| 2004/0111396 A1 | 6/2004 | Musayev et al. | |
| 2004/0137954 A1 | 7/2004 | Engstrom et al. | |
| 2004/0153329 A1 | 8/2004 | Casati | |
| 2004/0158429 A1 | 8/2004 | Bary | |
| 2004/0172409 A1 | 9/2004 | James | |
| 2004/0172599 A1 | 9/2004 | Calahan | |
| 2004/0177053 A1 | 9/2004 | Donoho | |
| 2004/0205082 A1 | 10/2004 | Fontoura et al. | |
| 2004/0205110 A1 | 10/2004 | Hinshaw | |
| 2004/0220791 A1 | 11/2004 | Lamkin | |
| 2004/0260829 A1 | 12/2004 | Husak | |
| 2005/0052427 A1 | 3/2005 | Wu et al. | |
| 2005/0055631 A1 | 3/2005 | Scardina et al. | |
| 2005/0138081 A1 | 6/2005 | Aishab et al. | |
| 2005/0165724 A1 | 7/2005 | West | |
| 2005/0182758 A1 | 8/2005 | Seitz et al. | |
| 2006/0017692 A1 | 1/2006 | Wehrenberg et al. | |
| 2006/0033625 A1* | 2/2006 | Johnson et al. | 340/573.1 |
| 2006/0059268 A1 | 3/2006 | Victor | |
| 2006/0069942 A1 | 3/2006 | Brasilerio et al. | |
| 2006/0074741 A1 | 4/2006 | Orumchian et al. | |
| 2006/0100969 A1* | 5/2006 | Wang et al. | 705/400 |
| 2006/0123119 A1 | 6/2006 | Hill et al. | |
| 2006/0130070 A1 | 6/2006 | Graf | |
| 2006/0136448 A1 | 6/2006 | Cialini et al. | |
| 2006/0149849 A1* | 7/2006 | Raz | 709/231 |
| 2006/0161523 A1 | 7/2006 | Dettinger | |
| 2006/0161528 A1 | 7/2006 | Dettinger et al. | |
| 2006/0230071 A1 | 10/2006 | Kass et al. | |
| 2006/0248182 A1 | 11/2006 | Glassco et al. | |
| 2006/0253831 A1 | 11/2006 | Harper | |
| 2006/0265406 A1 | 11/2006 | Chkodrov | |
| 2006/0282695 A1 | 12/2006 | Mital et al. | |
| 2007/0043856 A1 | 2/2007 | Morris et al. | |
| 2007/0118545 A1 | 5/2007 | Chandrasekharan et al. | |
| 2007/0136239 A1 | 6/2007 | Lee et al. | |
| 2007/0168990 A1 | 7/2007 | Alshab et al. | |
| 2007/0237410 A1 | 10/2007 | Cormode et al. | |
| 2007/0255529 A1 | 11/2007 | Biazetti et al. | |
| 2007/0276815 A1 | 11/2007 | Naibo | |
| 2007/0294217 A1* | 12/2007 | Chen et al. | 707/2 |
| 2008/0016095 A1* | 1/2008 | Bhatnagar et al. | 707/101 |
| 2008/0021666 A1 | 1/2008 | Goode et al. | |
| 2008/0065590 A1 | 3/2008 | Castro | |
| 2008/0065666 A1 | 3/2008 | Rose et al. | |
| 2008/0114803 A1 | 5/2008 | Chinchwadkar | |
| 2008/0120283 A1 | 5/2008 | Liu | |
| 2008/0133891 A1 | 6/2008 | Salz | |
| 2008/0134135 A1 | 6/2008 | Elaasar | |
| 2008/0134158 A1 | 6/2008 | Salz et al. | |
| 2008/0214902 A1 | 9/2008 | Lee et al. | |
| 2008/0215428 A1 | 9/2008 | Ramer | |
| 2008/0256384 A1 | 10/2008 | Branson et al. | |
| 2008/0284738 A1 | 11/2008 | Hovden | |
| 2008/0301124 A1 | 12/2008 | Alves et al. | |
| 2008/0301135 A1 | 12/2008 | Alves et al. | |
| 2008/0301175 A1 | 12/2008 | Applebaum | |
| 2009/0012867 A1 | 1/2009 | Lerman et al. | |
| 2009/0037370 A1 | 2/2009 | Mishra | |
| 2009/0052341 A1 | 2/2009 | Enqvist | |
| 2009/0070765 A1* | 3/2009 | Alves et al. | 718/103 |
| 2009/0070786 A1 | 3/2009 | Alves | |
| 2009/0100029 A1* | 4/2009 | Jain et al. | 707/4 |
| 2009/0106190 A1* | 4/2009 | Srinivasan et al. | 707/2 |
| 2009/0106218 A1* | 4/2009 | Srinivasan et al. | 707/4 |
| 2009/0125550 A1 | 5/2009 | Barga et al. | |
| 2009/0125635 A1* | 5/2009 | Barga et al. | 709/231 |
| 2009/0150367 A1 | 6/2009 | Melnik | |
| 2009/0178059 A1* | 7/2009 | Lang et al. | 719/318 |
| 2009/0204551 A1* | 8/2009 | Wang et al. | 705/400 |
| 2009/0219166 A1 | 9/2009 | MacFarlane | |
| 2009/0222793 A1 | 9/2009 | Frank et al. | |
| 2009/0228465 A1* | 9/2009 | Krishnamurthy et al. | 707/4 |
| 2009/0265336 A1 | 10/2009 | Suntinger et al. | |
| 2009/0278828 A1 | 11/2009 | Fletcher et al. | |
| 2009/0319501 A1* | 12/2009 | Goldstein et al. | 707/4 |
| 2009/0319687 A1* | 12/2009 | Goldstein et al. | 709/241 |
| 2010/0017214 A1 | 1/2010 | Ambrosio et al. | |
| 2010/0017379 A1 | 1/2010 | Naibo et al. | |
| 2010/0041391 A1 | 2/2010 | Spivey et al. | |
| 2010/0088325 A1 | 4/2010 | Goldstein et al. | |
| 2010/0121744 A1 | 5/2010 | Belz et al. | |
| 2010/0123737 A1 | 5/2010 | Williamson | |
| 2010/0125545 A1 | 5/2010 | Navas | |
| 2010/0131538 A1 | 5/2010 | Jones et al. | |
| 2010/0138285 A1 | 6/2010 | Leonard | |
| 2010/0141571 A1 | 6/2010 | Chiang | |
| 2010/0141658 A1 | 6/2010 | Danton et al. | |
| 2010/0280857 A1 | 11/2010 | Liu et al. | |
| 2010/0331146 A1 | 12/2010 | Kil | |
| 2011/0016123 A1 | 1/2011 | Pandey | |
| 2011/0032268 A1 | 2/2011 | Takei | |
| 2011/0040808 A1 | 2/2011 | Joy et al. | |
| 2011/0059775 A1 | 3/2011 | Choi et al. | |
| 2011/0093162 A1 | 4/2011 | Nielsen | |
| 2011/0093306 A1 | 4/2011 | Nielsen et al. | |

(56) References Cited

U.S. PATENT DOCUMENTS

| | | | |
|---|---|---|---|
| 2011/0093490 | A1 | 4/2011 | Schindlauer et al. |
| 2011/0093723 | A1 | 4/2011 | Brown et al. |
| 2011/0093866 | A1 | 4/2011 | Grabs et al. |
| 2011/0169823 | A1 | 7/2011 | Barenburg |
| 2011/0176720 | A1 | 7/2011 | Van Osten |
| 2011/0213664 | A1 | 9/2011 | Osterhout |
| 2011/0261048 | A1 | 10/2011 | Lee |
| 2012/0036485 | A1 | 2/2012 | Watkins |
| 2012/0084322 | A1 | 4/2012 | Goldstein et al. |
| 2012/0268391 | A1 | 10/2012 | Somers |
| 2013/0014094 | A1 | 1/2013 | Chkodrov et al. |
| 2013/0201303 | A1 | 8/2013 | Shimotani |
| 2013/0229330 | A1 | 9/2013 | Elyada et al. |
| 2013/0229403 | A1 | 9/2013 | Elyada et al. |
| 2013/0262645 | A1 | 10/2013 | Akchurin et al. |
| 2015/0134698 | A1 | 5/2015 | Schindlauer et al. |

FOREIGN PATENT DOCUMENTS

| | | | |
|---|---|---|---|
| JP | 2004-240766 | | 8/2004 |
| WO | WO 92/15066 | * | 9/1992 |
| WO | WO2007035452 | | 3/2007 |

OTHER PUBLICATIONS

Tucker et al., "Exploiting Punctuation Semantics in Continuous Data Streams", IEEE Transactions on Knowledge & Data Engineering, vol. 15, No. 3, May/Jun. 2003.*

Babcock, et al.; "Models and Issues in Data Stream Systems"; Proceedings of the 21$^{st}$ ACM SIGMOD-SIGACT-SIGART Symposium on Principles of Database Systems (PODS '02); 2002; pp. 1-30.

Babu, et al. "StreaMon: An Adaptive Engine for Stream Query Processing"; ACM International Conference on Management of Data (SIGMOD 2004); 2004; pp. 931-932.

Barga, et al.; "Coping with Variable Latency and Disorder in Distributed Event Streams"; 26$^{th}$ IEEE International Conference on Distributed Computing Systems Workshops *ICDCSW'06); 2006; pp. 6.

Barish et al.; "Speculative Plan Execution for Information Gathering"; 2008; pp. 1-50.

Barish et al.; "Speculative Execution for Information Gathering Plans"; 2002; pp. 184-193.

Chen, et al. "NiagaraCQ: A Scalable Continuous Query System for Internet Databases"; Proceedings of the 2000 ACM SIGMOD International Conference on Management of Data; 2000; pp. 379-390.

Cherniack, et al.; "Scalable Distributed Stream Processing"; Proceedings of the 2003 CIDR Conference; 2003; pp. 1-12.

Goldstein, J. et al.; "Flying Fixed-Point: Recursive Processing in Stream Queries"; VLDB '08; Aug. 24-30, 2008; Auckland, New Zealand.

Pallickara; "A Grid Event Service"; Graduate School of Syracuse University; Jun. 2001; pp. 110.

Preiss et al.; "On the Trade-off between Tim and Space in Optimistic Parallel Discrete-Event Simulation"; 1992; pp. 1-10.

Smith, M.; "Support for Speculative Execution in High-Performance Processors"; 1992; pp. 7-89.

Srivastava, et al.; "Operator Placement for In-Network Stream Query Processing"; Technical Report; 2004; pp. 10.

Wu, E. et al.; "High-Performance Complex Event Processing Over Streams"; Jun. 2006; pp. 407-418.

Barga, R. et al.; "Consistent Streaming Through Time: A Vision for Event Stream Processing"; CIDR; 2007; pp. 363-374.

Bry, et al.; "A High-Level Query Language for Events"; Proceedings of the IEEE Services Computing Workshops; 2006; pp. 31-38.

"Complex Event Processing (CEP)"; retrieved from http://www.progress.com/psm/apama/data-streams/index.ssp; Progress Software; Mar. 9, 2007; 3 pages.

"Complex Event Processing Made Simple Using Esper"; The Server Side.com; Apr. 2008; 6 pages.

"Complex Event Processing Tutorial"; retrieved from http://www.eventstreamprocessing.com/CEP-tutorial.htm; Jun. 2007; 2 pages.

Event-Driven Models and Complex Event Processing; retrieved from http://www.cxo.eu.com/article/Event-driven-models-and-complex-event-proceesing; 2009; 5 pages.

"Event Stream Intelligence with Esper and NEsper"; retrieved from http://esper.codehaus.org; retrieved Mar. 7, 2011; 4 pages.

Grabs, et al.; "Introducing Microsoft's Platform for Complex Event Processing"; May 2009; 24 pages.

Grabs, et al.; "Introducing Microsoft Stream Insight"; Sep. 2009; 27 pages.

Gyllstrom, D. et al.; "SASE: Complex Event Processing over Streams"; 3$^{rd}$ Biennial Conference on Innovative Data Systems Research (CIDR); Jan. 2007; pp. 407-411.

Jiang, et al.; "Anatomy of a Data Stream Management System"; Proceedings of ADBIS Research Communications; 2006; 16 pages.

Jiang, et al.; "Estreams: Towards an Integrated Model for Event and Stream Processing"; Technical Report CSE-2004-3; University of Texas at Arlington; Jul. 1, 2004; 25 pages.

Johnson, et al.; "A Heartbeat Mechanism and its Application in Gigascope"; VLDB; 2005; pp. 1079-1088.

"Microsoft StreamInsight"; retrieved from http://msdn.microsoft.com/en-us/library/ee362541 (SQL.105.printer).aspx; 2009; 2 pages.

Oberoi, et al.; "Integrating DDS and COTS Complex-Event Processing Engines"; Proceedings of Object Management Group Workshop; Jul. 2007; 42 pages.

"Oracle CEP 11gR1- official support for CQL"; retrieved from http://adcalves.workpress.com/2009/07/01/oracle-cep-11grl-official-support-for-cgi; Jul. 1, 2009; 3 pages.

Raizman, et al.; "An Extensible Test Framework for the Microsoft StreamInsight Query Processor"; Proceedings of the Third International Workshop on Testing Database Systems; Jun. 7, 2010; 6 pages.

Ravindran et al.; "A Resource Management Model for Dynamic, Scalable, Dependable, Real-Time Systems"; Proceedings of the 3$^{rd}$ Workshop on Embedded High Performance Computing; 1998; pp. 931-936.

Snoeren, et al.; "Mesh-Based Content Routing using XML"; 18$^{th}$ ACM Symposium on Operating System Principles; 2001; pp. 160-173.

Srivastava, et al.; "Flexible Time Management in Data Stream Systems"; Proceedings of the Twenty-Third ACM SIGMOD-SIGART-SIGART Symposium on Principles of Database Systems; Jun. 14-16, 2004; Paris, France; pp. 263-274.

"StreamInsight SQL Server 2008 R2"; retrieved from http://www.microsoft.com/sqlserver/2008/en/us/R2-complex-eventaspx; 2009; 2 pages.

"Using the Query Binder—SQL Server 2008 R2"; Explicit Server Development Model; retrieved from http://msdn.microsoft.com/en-us/library/ee391319(SQL.105).aspx ; 2009; 5 pages.

Wei, et al.; "ReCEPtor: Sensing Complex Events in Data Streams for Service-Oriented Architectures"; HPL-2007-176; Digital Printing and Imaging Laboratory; HP Laboratories, Palo Alto, CA; Nov. 2, 2007; 22 pages.

Non-Final Office Action dated May 28, 2010 from U.S. Appl. No. 11/937,118; 21 pages.

Final Office Action dated Dec. 3, 2010 from U.S. Appl. No. 11/937,118; 19 pages.

Non-Final Office Action dated Mar. 18, 2011 from U.S. Appl. No. 11/937,118; 22 pages.

Final Office Action dated Oct. 14, 2011 from U.S. Appl. No. 11/937,118; 20 pages.

Notice of Allowance dated Jun. 12, 2012 from U.S. Appl. No. 11/937,118; 13 pages.

Notice of Allowance dated Oct. 5, 2012 from U.S. Appl. No. 11/937,118; 24 pages.

Non-Final Office Action dated Mar. 17, 2011 from U.S. Appl. No. 12/246,509; 22 pages.

Notice of Allowance dated Sep. 9, 2011 from U.S. Appl. No. 12/246,509; 23 pages.

Notice of Allowance dated Aug. 28, 2012 from U.S. Appl. No. 12/246,509; 24 pages.

U.S. Appl. No. 13/438,836 to Akchurin et al. filed Apr. 3, 2012; 36 pages.

U.S. Appl. No. 13/189,566 to Nano et al. filed Jul. 25, 2011; 41 pages.

U.S. Appl. No. 12/246,509, filed Oct. 7, 2008, Goldstein.

(56) References Cited

OTHER PUBLICATIONS

U.S. Appl. No. 11/937,118, filed Nov. 8, 2007, Barga.
U.S. Appl. No. 11/937,011, filed Nov. 8, 2007, Barga.
U.S. Appl. No. 12/603,445, filed Oct. 21, 2009, Grabs.
U.S. Appl. No. 13/189,566, Jul. 25, 2011, Nano.
U.S. Appl. No. 13/438,836, filed Apr. 3, 2012, Akchurin.
Goldstein, "Operator Algorithm Design for Speculative Stream Processing", Microsoft Research Technical Report MSR-TR-2007-158, Dec. 2007. (Previously titled as "Consistency Sensitive Operators in CEDR".).
Ramakrishnan, "Efficient Bottom-Up Evaluation of Logic Programs", Computer Systems and Software Engineering, Kluwer Academic Publishers, 1992.
Tucker, "Exploiting Punctuation Semantics in Continuous Data Streams", IEEE Transactions on Knowledge and Data Engineering, vol. 15, No. 3, May/Jun. 2003.
Li, "Semantics and Evaluation Techniques for Window Aggregates in Data Streams", In Proceedings of the ACM SIGMOD International Conference on Management of Data, Jun. 14-16, 2005.
Gyllstrom, "On Supporting Kleene Closure over Event Streams", Proceedings of the 24th International Conference on Data Engineering, Apr. 7-12, 2008.
Demers, "Cayuga: A General Purpose Event Monitoring System", Third Biennial Conference on Innovative Data Systems Research, Jan. 7-10, 2007.
Arasu, "CQL: A Language for Continuous Queries over Streams and Relations", 9th International Workshop on Database Programming Languages, Sep. 6-8, 2003.
Hammad, "Nile: A Query Processing Engine for Data Streams", Proceedings of the 20th International Conference on Data Engineering, Mar. 30-Apr. 2, 2004.
Maier, "Semantics of Data Streams and Operators", Proceedings of the 10th international Conference on Database Theory, Jan. 5-7, 2005.
Witkowski, "Continuous Queries in Oracle", Proceedings of the 33rd international Conference on Very Large Data Bases, Sep. 23-28, 2007.
Li, "Study on Smoothing Browser in Multi-View Virtual Space Based on Panorama", In Proceedings of the International Archives of the Photogrammetry, Remote Sensing and Spatial Information Sciences, Jul. 3-11, 2008.
"Interactive Advertising Bureau: Mobile Rich-media Ad Interface Definitions (MRAID) v.1.0", Oct. 20, 2011.
Bavor, "Uncover Your World" with AdMob Rich Media and the Google Search App, Aug. 26, 2011.
Nasiri, "Motion Processing: The Next Breakthrough Function in Handsets", Jul. 2009.
"Yahoo! Living Ads: Where Motion and Emotion Meet", Published On or Before Dec. 13, 2011.
Wong, "The Emerging Trend: Smartphone Ad and In-App Ad", Published on or Before Dec. 13, 2011.
Barga, "CEDR—Complex Event Detection and Response: Research Brief (CEDR)", Microsoft TechFest, Mar. 1-2, 2006.
Barga, "Event Correlation and Pattern Detection in CEDR", In Proceedings of the Extending Database Technology Workshops, Reactivity on the Web, Mar. 26-31, 2006.
Baulier, "A Database System for Real-Time Event Aggregation in Telecommunication", In Proceedings of the 24th Conference on Very Large Data Bases, Aug. 24-27, 1998.
"C# Version 3.0 Specification", Microsoft, May 2006.
"StreamBase Studio", Published On or Before May 7, 2007.
"StreamBase Server", Published On or Before May 7, 2007.
"StreamSQL", Published On or Before Nov. 13, 2006.
Chandrasekaran, "TelegraphCQ: Continuous Dataflow Processing for and Uncertain World", In Proceedings of the 1st Conference on Innovative Data Systems Research, Jan. 5-8, 2003.
Dean, "MapReduce: Simplified Data Processing on Large Clusters", In Proceedings of the 6th Symposium on Operating Systems Design and Implementation, Dec. 6-8, 2004.

Isard, "Dryad: Distributed Data-Parallel Programs from Sequential Building Blocks", In Proceedings of EuroSys, Mar. 21-23, 2007.
Berenson, "Microsoft SQL Server Query Processor Internals and Architecture", Microsoft, Jan. 2000.
"Integration Services Architecture", Microsoft, Published On or Before Jul. 17, 2006.
"BAM API (BizTalk Server Sample)", Microsoft, Published On or Before 2007.
Milner, "BizTalk Server 2004: A Messaging Engine Overview", May 2005.
"System Center Operations Manager 2007 End to End Service Management Without the Day to Day Drama", Microsoft, 2006.
"BizTalk Server 2006 R2", Microsoft, 2006.
Yoneki, "Unified Semantics for Event Correlation Over Time and Space in Hybrid Network Environments", 2005.
"BizTalk Server 2004: BizTalk Server Rules Framework", Microsoft White Paper, Dec. 2003.
Sooksanan, "Validation Rules for Exporting Business Process Diagram to Business Process Execution Language", In Proceedings of the 4th International Conference on eBusiness, Nov. 19-20, 2005.
Loddengaard, "FoneDoktor, A WibiData Application", Dec. 6, 2011.
Jensen, "Temporal Specialization", In Proceedings of the 8th International Conference on Data Engineering, Feb. 3-7, 1992.
Carlson, "An Event Detection Algebra for Reactive Systems", In Proceedings of the 4th ACM International Conference on Embedded Software, Sep. 27-29, 2004.
Bonnet, "Towards Sensor Database Systems", In Proceedings of the 2nd International Conference on Mobile Data Management, Jan. 8-10, 2001.
Srinivasan, "Airborne Traffic Surveillance Systems: Video Surveillance of Highway Traffic", In Proceedings of the 2nd ACM International Workshop on Video Surveillance and Sensor Networks, Oct. 15, 2004.
Babu, "A Data Stream Management System for Network Traffic Management", In Proceedings of the Workshop on Network-Related Data Management, May 25, 2001.
Arasu, "The CQL Continuous Query Language: Semantic Foundations and Query Execution", In the VLDB Journal, Jun. 2006.
Zimmer, "On the Semantics of Complex Events in Active Database Management Systems", In Proceedings of the 15th International Conference on Data Engineering, Mar. 23-26, 1999.
Madden, "Continuously Adaptive Continuous Queries Over Streams", In Proceedings of the ACM SIGMOD International Conference on Management of Data, Jun. 4-6, 2002.
Abadi, "Aurora: A New Model and Architecture for Data Stream Management", In the VLDB Journal, Aug. 2003.
Naughton, "The Niagara Internet Query System", IEEE Database Engineering Bulletin, Jun. 2001.
Franklin, "Design Considerations for High Fan-In Systems: The HiFi Approach", In Proceedings of the 2nd Conference on Innovative Data Systems Research, Jan. 4-7, 2005.
Abadi, "The Design of the Borealis Stream Processing Engine", In Proceedings of the 2nd Conference on Innovative Data Systems Research, Jan. 4-7, 2005.
Arasu, "Stream: The Stanford Stream Data Manager", In Proceedings of the ACM SIGMOD International Conference on Management of Data, Jun. 9-12, 2003.
Cranor, "Gigascope: A Stream Database for Network Applications", In Proceedings of the ACM SIGMOD International Conference on Management of Data, Jun. 9-12, 2003.
Ghanem, "Exploiting Predicate-Window Semantics Over Data Streams", In Proceedings of the ACM SIGMOD International Conference on Management of Data, Jun. 27-29, 2006.
Ghanem, "Incremental Evaluation of Sliding-Window Queries Over Data Streams", In Proceedings of the IEEE Transactions on Knowledge and Data Engineering, Jan. 2007.
Chakravarthy, "Composite Events for Active Databases: Semantics, Contexts and Detection", In Proceedings of the 20th International Conference on Very Large Data Bases, Sep. 12-15, 1994.
Demers, "Towards Expressive Publish/Subscribe Systems", In Proceedings of the 10th International Conference on Extending Database Technology, Mar. 26-31, 2006.

(56) References Cited

OTHER PUBLICATIONS

Ali, "Microsoft CEP Server and Online Behavioral Targeting", In Proceedings of the ACM International Conference on Very Large Data Bases, Aug. 24-28, 2009.
"International Search Report and Written Opinion", From Application No. PCT/US2008/070359, dated Jan. 19, 2009.
"Non-Final Office Action", From U.S. Appl. No. 13/409,495, filed Mar. 1, 2012, Mailed: Dec. 20, 2013.
"Response to the Dec. 20, 2013 Non-Final Office Action", From U.S. Appl. No. 13/409,495, Mailed: Apr. 21, 2014.
"Final Office Action and Examiner Initiated Interview Summary", From U.S. Appl. No. 13/409,495, Mailed: Jun. 6, 2014.
"Response to the Jun. 6, 2014 Final Office Action", From U.S. Appl. No. 13/409,495, Mailed: Aug. 8, 2014.
"Non-Final Office Action", From U.S. Appl. No. 13/409,495, Mailed: Aug. 23, 2014.
"Non-Final Office Action", From U.S. Appl. No. 13/409,443, filed Mar. 1, 2012 Mailed: Aug. 4, 2014.
"Non-Final Office Action", From U.S. Appl. No. 12/603,308, filed Oct. 21, 2009, Mailed: Nov. 9, 2011.
"Response to the Nov. 9, 2011 Non-Final Office Action", From U.S. Appl. No. 12/603,308, Mailed: Feb. 9, 2012.
"Final Office Action", From U.S. Appl. No. 12/603,308, Mailed: May 15, 2012.
"Response to the May 15, 2012 Final Office Action", From U.S. Appl. No. 12/603,308, Mailed: Aug. 15, 2012.
"Non-Final Office Action", From U.S. Appl. No. 12/603,308, Mailed: Jul. 18, 2014.
"Response to the Jul. 18, 2014 Non-Final Office Action", From U.S. Appl. No. 12/603,308, Mailed: Oct. 20, 2014.
"Non-Final Office Action", From U.S. Appl. No. 13/614,184, filed Sep. 13, 2012, Mailed: Nov. 21, 2013.
"Response to the Nov. 21, 2013 Non-Final Office Action and Terminal Disclaimer", From U.S. Appl. No. 13/614,184, Mailed: Jan. 22, 2014.
"Event Processing with Esper and Nesper", Retrieved From: <<http://esper.codehaus.org>>, Jul. 16, 2012.
Lepage, Pete, "This End Up: Using Device Orientation", Retrieved at:<<http://www.html5rocks.com/en/tutorials/device/orientation/>>, Apr. 29, 2011.
JadeDragon, "iPad Game Review: CF Defense HD", Retrieved at: <<http://www.mobiletechreview.com/ubbthreads/showflat.php?Cat=0&Number=37978&an=0&page=13>>, Jul. 26, 2010.
U.S. Appl. No. 14/300,912, filed Jun. 10, 2014.
Notice of Allowance mailed Jun. 2, 2015 from U.S. Appl. No. 12/603,308, 16 pages.
Response/Amendment filed Jun. 29, 2015, to Non-Final Office Action mailed Dec. 29, 2014, from U.S. Appl. No. 13/409,443, 18 pages.
Non-Final Office Action Mailed Feb. 1, 2013, From U.S. Appl. No. 13/189,566, 19 pages.
Notice of Allowance Mailed Jul. 27, 2012, From U.S. Appl. No. 12/694,062, 11 pages.
Response Filed Dec. 4, 2014, to the Non-Final Office Action Mailed Sep. 4, 2014, From U.S. Appl. No. 13/409,443, 16 pages.
Final Office Action Mailed Dec. 29, 2014, From U.S. Appl. No. 13/409,443, 30 pages.
Response Filed Dec. 23, 2014, to the Non-Final Office Action Mailed Sep. 23, 2014, From U.S. Appl. No. 13/409,495, 15 pages.
Notice of Allowance Mailed Jan. 20, 2015, From U.S. Appl. No. 13/409,495, 5 pages.
Notice of Allowance Mailed Apr. 2, 2015, From U.S. Appl. No. 12/603,308, 16 pages.
Preliminary Amendment U.S. Appl. No. 14/602,742, filed Jan. 30, 2015, 7 pages.
Non-Final Office Action Mailed Mar. 12, 2014, From U.S. Appl. No. 13/438,836, 12 pages.
Response Filed Jun. 12, 2014, to the Non-Final Office Action Mailed Mar. 12, 2014, From U.S. Appl. No. 13/438,836, 12 pages.
Final Office Action Mailed Jul. 25, 2014 From U.S. Appl. No. 13/438,836, 12 pages.
Response Filed Oct. 27, 2014, to the Final Office Action Mailed Jul. 25, 2014, From U.S. Appl. No. 13/438,836, 14 pages.
Non-Final Office Action Mailed Sep. 4, 2014 From U.S. Appl. No. 13/409,443, 24 pages.
Non-Final Office Action, Mailed May 11, 2015, From U.S. Appl. No. 13/438,836, 11 pages.
Smoothing Sensor Data with a Low-Pass Filter, Nichols, Aug. 24, 2011, Retrieved From: http://blog.thomnichols.org/2011/08/smoothing-sensor-data-with-a-low-pass-filter, 3 Pages.
Non-Final Office Action Mailed Aug. 13, 2015 From U.S. Appl. No. 14/602,742, 17 Pages.
Response Filed Aug. 10, 2015 to the Non-Final Office Action Mailed May 11, 2015 From U.S. Appl. No. 13/438,836, 19 pages.
Response filed Nov. 13, 2015 to Aug. 13, 2015 Non-Final Office Action mailed from U.S. Appl. No. 14/602,742, 12 pages.
Terminal Disclaimer filed on Nov. 13, 2015 from U.S. Appl. No. 14/602,742, 3 pages.

\* cited by examiner

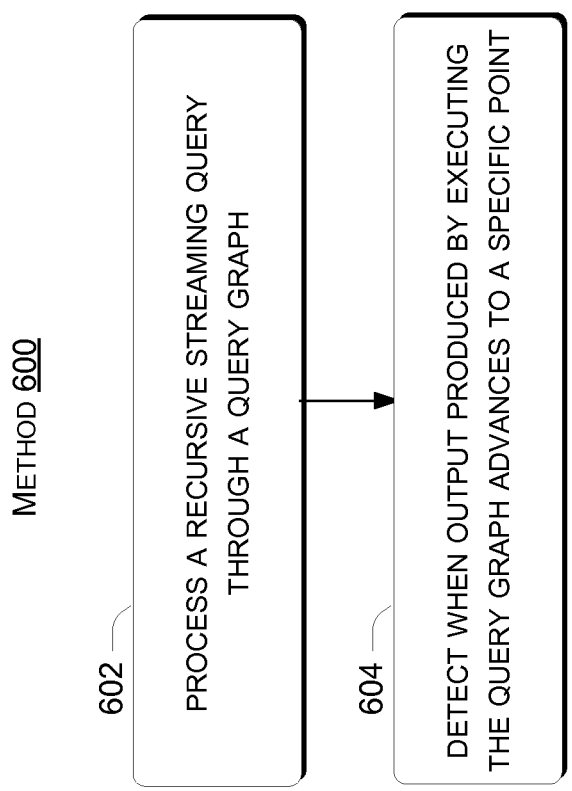

RECURSIVE PROCESSING IN STREAMING QUERIES

CROSS-REFERENCE TO RELATED APPLICATIONS

This patent application is a divisional of, and claims priority from, U.S. patent application Ser. No. 12/246,509, filed on Oct. 7, 2008, now abandoned which is incorporated herein by reference in its entirety.

BACKGROUND

Computers are very effective at storing large amounts of data, such as in a database. Over the last half century or so, techniques have been refined for establishing computational options, such as accessing or querying the stored data, viewing the data, modifying the data, etc. In these scenarios, the data can be thought of as relatively static and so the techniques, such as database querying techniques tend not to be very applicable to time sensitive scenarios, such as those involving real-time or near real-time. For instance, a database query technique designed to retrieve a definition of a word from a dictionary database need not be time sensitive since the data is statically stored in the database.

In contrast, other scenarios tend to involve streaming data in real-time or near real-time. For instance, a temperature sensor may be configured to periodically output a time-stamped signal corresponding to a sensed temperature. When viewed collectively this output can be thought of as a stream of data or a data stream. The above mentioned database querying techniques are not generally applicable in the data stream scenarios. Instead, stream processing techniques have been developed for use with data streams.

Stream processing techniques offer much more limited computational options than those available in traditional database scenarios. Stated another way, a very small set of computations can presently be performed with stream processing. The present concepts introduce new stream processing techniques that greatly increase the set of computations that can be accomplished with stream processing.

SUMMARY

The described implementations relate to recursive streaming queries. One method or technique processes a recursive streaming query through a query graph. The technique also detects when output produced by executing the query graph advances to a specific point.

Another implementation is manifested as a method that processes at least one input stream associated with a recursive streaming query. The technique also advances time for the recursive streaming query to a specific point when at least one input stream has advanced to the specific point and recursive computations on the input stream are complete to the point.

The above listed examples are intended to provide a quick reference to aid the reader and are not intended to define the scope of the concepts described herein.

BRIEF DESCRIPTION OF THE DRAWINGS

The accompanying drawings illustrate implementations of the concepts conveyed in the present application. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the Figure and associated discussion where the reference number is first introduced.

FIG. 6 is a flowchart of exemplary recursive streaming query processing techniques in accordance with some implementations of the present concepts.

DETAILED DESCRIPTION

Overview

This patent application pertains to stream processing and more specifically to recursive streaming queries. A data stream or streaming data can be thought of as events or notifications that are generated in real-time or near real-time. For introductory discussion purposes, an event can be thought of as including event data or payload and a timestamp.

Processing recursive streaming queries can entail the use of one or more recursions. A recursion can be thought of as a function that is defined in terms of itself so that it can involve potentially infinite or unbounded computation. In a streaming data scenario, computation resources are reserved for specific events until the resources are no longer needed. The present implementations offer solutions for detecting when recursive processing is completed up to a specific point in time. Thus, the recursion may remain infinite, but the present techniques can identify specific time periods for which the recursive processing of streaming queries is complete. Computation resources can then be freed up to the specific point in time.

Figure 1:
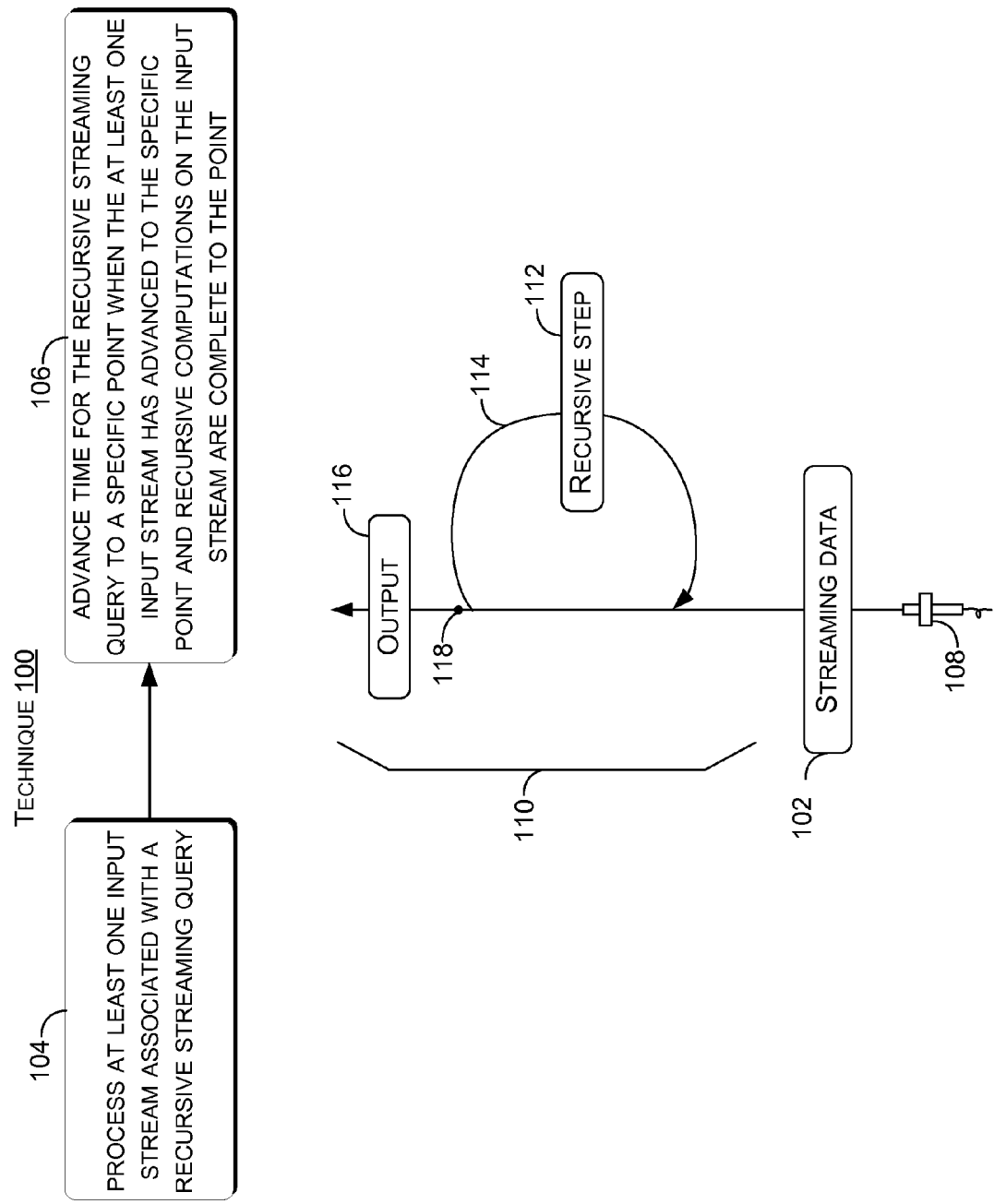
FIGS. 1-5 show exemplary graphs for processing recursive streaming queries in accordance with some implementations of the present concepts.

For instance, consider introductory FIG. 1 that illustrates an exemplary recursive streaming query processing method generally at 100. Accompanying streaming data upon which the method can be implemented is evidenced at 102. Generally, the method processes at least one input stream (i.e., streaming data 102) associated with a recursive streaming query at 104. At 106, the method also advances time for the recursive streaming query to a specific point when two conditions are met. First, the one input stream has advanced to the specific point and second, recursive computations on the input stream are complete to the point.

Assume for purposes of explanation, that streaming data 102 is emitted from a temperature sensor 108 and processed on a query graph 110. The temperature sensor is offered as a simple example of a source of streaming data and the skilled artisan should recognize many other sources, some examples of which are described below in relation to FIGS. 2-4. Further, in this example only a single data stream 102 is input into query graph 110. Other examples where multiple data streams are input into a query graph are described below in relation to FIGS. 2-5. A recursive streaming query relating to streaming data 102 can be performed on query graph 110 such as by performing a recursive step 112 via a recursive loop 114.

A recursive streaming query based on streaming data 102 can, in some instances, be characterized as infinite or running forever. However, portions of the recursive streaming query can be executed on recursive loop 114 to generate an output 116. The present implementations can detect when output 116 has advanced to a specific point in time.

In summary, even though the recursive streaming query may run indefinitely, the present implementations can detect when the query graph 110 has advanced to a specific point in time as portions of the recursive query are completed. This can also be thought of as detecting forward time progress. Stated another way, the technique can detect when a region of the query graph upstream of a certain point, such as point 118 has completed processing including recursive processing relative to a specific point in time. The technique can cause the query graph to issue a notice from point 118 that computations upstream from that point have advanced to the specific point in time.

Figure 2:
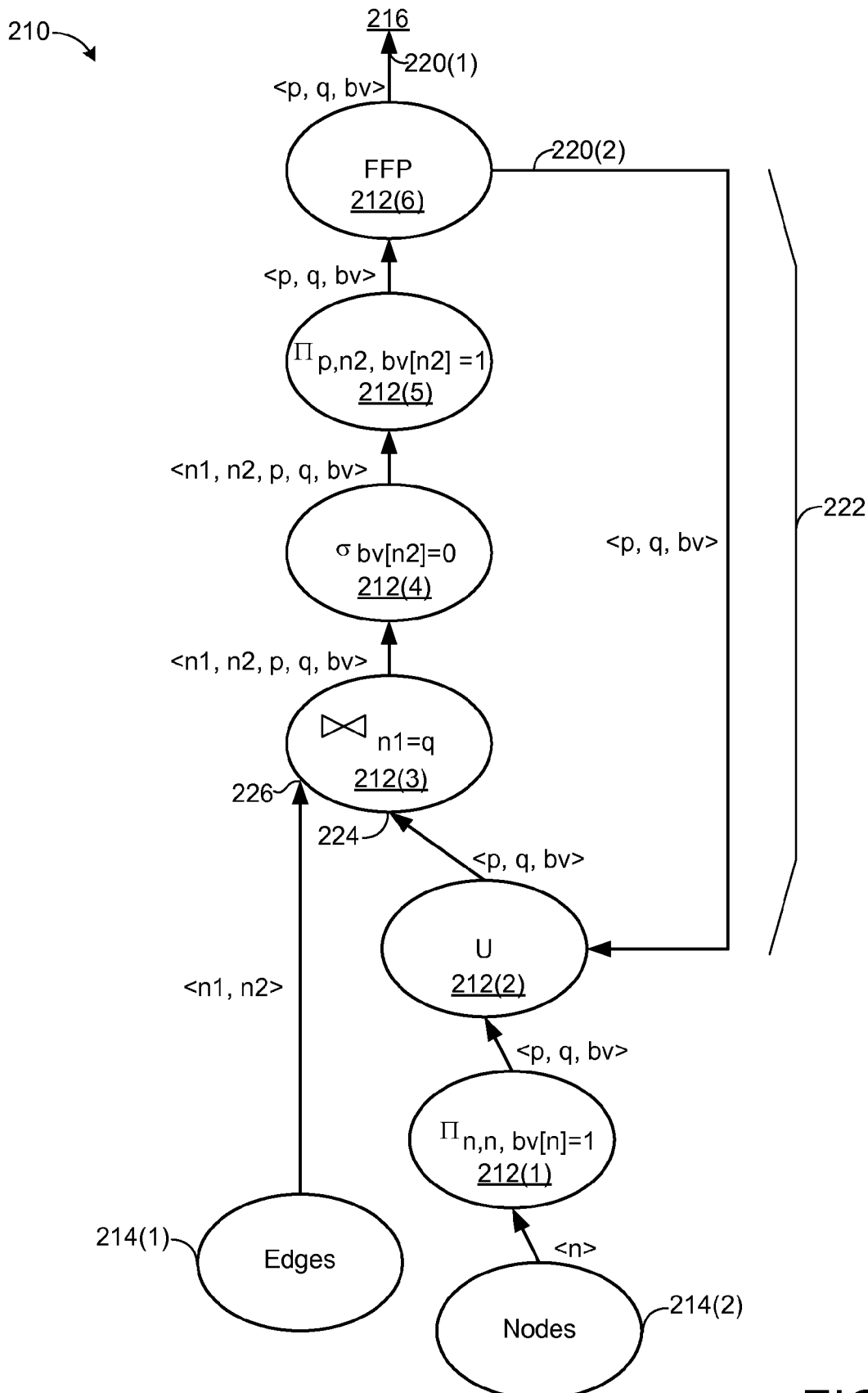

FIG. 1 introduces the concept that query graph 110 can process a recursive streaming query. FIG. 2 introduces examples of components that can accomplish the computations associated with processing a recursive streaming query.

FIG. 2 shows a query graph 210 that includes a plurality of operators 212 for processing a recursive search query from two input streams 214(1), 214(2).

In this case, query graph 210 includes six operators 212(1), 212(2), 212(3), 212(4), 212(5), and 212(6). The term "operator" 212 is used in that the operators "operate", or perform computations, upon the streaming data responsive to the recursive search query to generate an output from the graph at 216. Briefly, an operator can receive one or more inputs and process the inputs according to a set of conditions. If the conditions are satisfied, then the operator can generate an output that can be delivered to one or more other operators.

In the present case, operator 212(1) can be termed a "project" operator; operator 212(2) can be termed a "union" operator; operator 212(3) can be termed a "join" operator; operator 212(4) can be termed a "select" operator; operator 212(5) is another project operator; and operator 212(6) can be termed a (flying fixed-point (FFP)) operator. The function of these operators is described in more detail below.

Considered from one perspective, query graph 210 can be viewed as being defined by its operators since a number, type, and/or arrangement of operators can be adapted to specific recursive search queries. So, a query is achieved by operating on one or more input streams with the selected operators to generate an output.

Input data streams 214(1) and 214(2) describe a changing graph, composed of nodes and edges. 214(2) describes the (possibly changing) nodes in the changing graph, while 214(1) describes the changing set of edges between nodes. In other words, 214(1) and 214(2) can be thought of as defining a dynamic input graph that is operated on by query graph 210. The graph is dynamic in that the input streams can change over time.

For instance, consider an input graph where each edge is labeled with a number and the user wants to know what is the shortest path from one node to another node. Until the moment that the actual graph is generated, the number of steps that might be in that shortest path cannot be bound. So, that also has an unbounded nature in that the graph is unknown at the time of query creation.

The present concepts can be applied to many interesting streaming graph-search problems, such as finding a minimum path to a destination on a road network from a changing location and given changing traffic conditions. Another potential application can be regular expression matching over streams. Another application can be any form of looping where the process cannot bound the number of iterations at the time the recursive streaming query is created.

First Example

Reachability

Query graph 210 offers an example of how streaming query results are computed recursively through an example query. When viewed formally the present example can rely upon the following graph reachability query:

Given a directed graph $G=(N, E)$ with nodes $N= \{ni|i=1 \ldots j\}$, a and edges $E=\{(n1i, n2)|i=1 \ldots k\}$, compute all pairs $(n1, n2)$, $n1 \in N$, $n2 \in N$, such that $n2$ is reachable from $n1$ through one or more edges in E.

Note that the present techniques solve the formal problem stated above under the assumption that the graph is not known at compile time. Furthermore, the graph may change over time. The description of the graph is, therefore, in and of itself streaming. While this example might seem contrived, it is, in fact, a good starting point for discussing streaming queries over networks and roads, where both edge properties (e.g., traffic conditions) and graph structure (e.g., links failing and recovering in a network) are volatile.

This discussion introduces techniques for calculating results and lays the foundation for examining recursive streaming queries. For ease of explanation, assume that this recursive streaming query has a single window of infinite size, there are no retractions (for example, to revise erroneous or speculative items) in the input stream, and that there are no punctuations to deal with. All of these assumptions will be removed in later sections.

As mentioned above query graph 210 provides two input data streams 214(1) and 214(2). Data stream 214(1) relates to edges and data stream 214(2) relates to source nodes. Also note that the plan is a directed graph of streaming versions of relational operators, where each arrow in the diagram is a data stream, and is labeled with the schema of the events traveling along the data stream. Assume for discussion purposes that all stream events are tagged with the application time Vs at which the event becomes valid.

The data streams are can be interpreted as describing a changing relation. Since the present discussion assumes a single window of infinite duration, the contents of the relation at any time t can be all of the events with Vs t. Operators 212(1)-212(6) then output event streams that describe the changing view computed over the changing input according to the relational semantics of individual operators.

As introduced above, the present configuration utilizes an FFP operator 212(6). The FFP operator offers a means to achieve recursion. The FFP generates a multicast output 220 that is forwarded to a conventional, non-recursive output indicated at 220(1), as well as to one of its descendants in the operator graph. In this case, output 220(2) recursively loops back to union operator 212(2) thereby forming a recursive loop 222. The result can be thought of as a form of recursion which terminates when a fixed point is reached.

Another interesting feature of the illustrated configuration is the schema elements labeled "bv". These are, in fact, bit vectors, each of which is k bits long. The present techniques can use this bit vector to track visited nodes in query graph 210 and avoid infinite looping through cycles.

Figure 3:
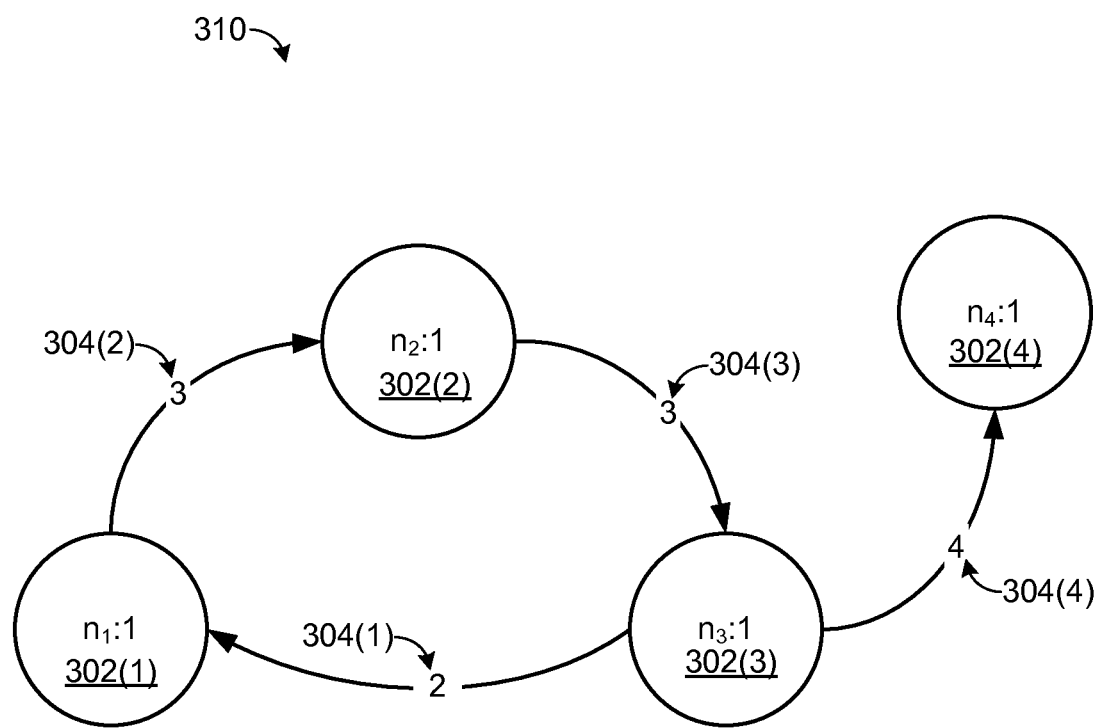

FIG. 3 shows a graph 310 that can be used as input for input stream 214(2) of FIG. 2. FIG. 3 illustrates nodes 302(1), 302(2), 302(3), and 302(4). Individual nodes 302(1)-302(4) are labeled with both the node name as well as the valid time for the node insertion event. Similarly, the graph also illustrates edges 304(1), 304(2), 304(3), and 304(4) with accompanying valid times of their edge insertion events. Viewed in light of FIG. 2, nodes 302(1)-302(4) are what would flow in on the nodes input 214(2). Similarly, nodes 304(1)-304(4) are what flow in on the edges input 214(1).

For the sake of concreteness and clarity, the present discussion will follow the execution of the query plan to completion for each distinct moment in time. The discussion will also rely upon the assumption that each operator processes input events in batches such that all input events with the same valid time are processed at once. The discussion is directed to the behavior of this plan at the four distinct points in time from time 1 to time 4. Since the present example includes 4 distinct nodes 302(1)-302(4), bv is 4 bits long.

Time 1: the technique receives four input events on the nodes data stream 214(2), which correspond to nodes n1, n2, n3, and n4 (i.e., 302(1)-302(4)). Recall that an event can be thought of as a payload and a timestamp. So for instance, node 302(1) with a timestamp of 1 is an event. Note that the projection above the nodes stream produces the following 4 events:

(1, $n_1$, $n_1$, 1000), (1, $n_2$, $n_2$, 0100),
(1, $n_3$, $n_3$, 0010), (1, $n_4$, $n_4$, 0001)

In FIG. 2, these events then travel through the union operator 212(2) and lodge in the join operator's right join synopsis as indicated at 224. Since there is no input on the left side of the join operator 212(3), the process has reached a fixed point. (If it was desired to limit the set of nodes considered as source nodes for reachability, the technique could limit the nodes stream 214(2) to only those nodes.)

Time 2: the technique can receive one event in the edges data stream 214(1). This edge travels up to the join operator 212(3), which then lodges it in its left synopsis at 226. The event is:

(2, $n_3$, $n_1$)

This event means that starting at time two, the input relation on the left side of the join operator 212(3) contains an edge going from n3 to n1. Given the join condition, this edge joins to one row on the right side: (1, n3, n3, 0010). The join operator 212(3) then outputs:

(2, $n_3$, $n_1$, $n_3$, $n_3$, 0010)

The select operator 212(4) then checks if there is a cycle by seeing if the path described above already includes the destination in the new, derived path. This determination is made by checking the 1st bit, since the technique is following the path to n1. Since this bit is not set, the event reaches the project operator 212(5), which removes unneeded columns and sets the appropriate bit in bv. The result is:

(2, $n_3$, $n_1$, 1010)

This result concludes that there exists a path from n3 to n1, and that this path first appeared at valid time 2. The technique now reaches the FFP operator 212(6), which both outputs the result from the query graph at 220(1), and inserts it into the union operator 212(2) below the join operator 212(3) via output 220(2). The join operator 212(3) then lodges the event in the right synopsis at 224, but is unable to join it to anything in its left synopsis at 226. The technique has now reached a fixed point.

Time 3: The technique receives two events in the edges data stream 214(1). These events travel up to the join operator 212(3) and lodge in its left synopsis 226. The events are:

(3, $n_1$, $n_2$), (3, $n_2$, $n_3$)

Note that at this point, the left join synopsis 226 contains the following entries:

(3, $n_1$, $n_2$), (3, $n_2$, $n_3$), (2, $n_3$, $n_1$)

By joining the two new events to entries in the right synopsis 224, the join operator 212(3) produces:

(3, $n_1$, $n_2$, $n_1$, $n_1$, 1000), (3, $n_1$, $n_2$, $n_3$. $n_1$, 1010),
(3, $n_2$, $n_3$, $n_2$, $n_2$, 0100)

All three events get past the select operator 212(4) since all the checked bits are 0, and therefore the process has not encountered a cycle yet. After projection by projection operator 212(5), these three events become:

(3, $n_1$, $n_2$, 1100), (3, $n_3$, $n_2$, 1110),
(3, $n_2$, $n_3$, 0110)

These entries are now output by the FFP operator 212(6) and loop around again to lodge in the join operator's right synopsis at 224. This time, however, the technique has not yet reached a fixed point. By joining the three new events to the join operator's left synopsis 226, the technique produces the following events:

(3, $n_2$, $n_3$, $n_1$, $n_2$, 1100), (3, $n_2$, $n_3$, $n_3$, $n_2$, 1110),
(3, $n_3$, $n_1$, $n_2$, $n_3$, 0110)

Continuing the query, the technique checks for cycles using select operator 212(4). Unlike previous times, this time, the technique finds a cycle. The second event has already visited n3. The technique therefore does not pass this event through to the next round of recursion and only continues with the first and third events. After projection, these become:

(3, $n_1$, $n_3$, 1110), (3, $n_2$, $n_1$, 1110)

These are now output and passed back to the union operator 212(2) for another round of recursion. These entries lodge in the join operator's right synopsis 224, and produce two new events. It is not hard to see that these new events cannot get past the select operator 212(4) since the first three bits are set for both events. The technique has again reached a fixed point. Note that the following output has been produced so far:

(2, $n_3$, $n_1$, 1010), (3, $n_1$, $n_2$, 1100), (3, $n_3$, $n_2$, 1110),
(3, $n_2$, $n_3$, 0110), (3, $n_1$, $n_3$, 1110), (3, $n_2$, $n_1$, 1110)

This output succinctly says that each of the first three nodes is reachable from all the other first three nodes.

Time 4: The technique receives an event in the edges data stream 214(1). This edge lodges in the join operator's left synopsis 226, and is:

(4, $n_3$, $n_4$)

The join operator 212(3) then produces:

(4, $n_3$, $n_4$, $n_3$, $n_3$, 0010), (4, $n_3$, $n_4$, $n_2$, $n_3$, 0110),
(4, $n_3$, $n_4$, $n_1$, $n_3$, 1110)

All of these events get through the select operator 212(4) since none have their 4th bits set, and become:

(4, $n_3$, $n_4$, 0011), (4, $n_2$, $n_4$, 0111),
(4, $n_1$, $n_4$, 1111)

The events are then output by the FFP operator 212(6), loop around, and lodge in join operator's right synopsis 224 without joining to anything. The technique has again reached a fixed point. Note that the output at time 4 says that n4 may be reached from any other node.

There are a few interesting observations that can be derived from this example.

First, for clarity, the above discussion presented the example in a way that quiesced the query between time increments. The same result, although possibly with a different output order, would have been achieved if new input were allowed into the recursive loop 222 before a fixed point had been reached. This outcome is possible because of the order insensitivity of the operators used in this recursive query plan. Operators, such as aggregation and difference, do not have this property, and can require either quiescence of the recursive loop between increasing valid time increments or implementations capable of speculative execution, when used in recursive queries. There will be further discussion of this point in later sections.

Second, the query avoided infinite loops by maintaining a careful notion of progress in the form of the visited bit vector. This notion of progress can be a key to proving that a particular recursive query terminates with the correct answer, and is discussed formally in the formalism section below.

Traditional notions of punctuations would likely fail if used in the context of this query, since operators in the recursive loop wait on themselves for a punctuation. The punctuations would therefore become blocked at the union and join operators 212(2), 212(3), respectively, which would receive punctuations from their non-recursive inputs, but never the recursive one. This issue is addressed fully in the formalism section below.

Formalism

The following discussion formally defines concepts related to streams, punctuations, and queries. The discussion also describes what is required for an operator implementation to be speculation friendly, and prove that the FFP operator 212(6) functions correctly with appropriate inputs, streams, and operators.

The present concepts can utilize a formal model of streams that tends to encompass most previous stream models. Formally, a stream R is a potentially unbounded sequence e1, e2, . . . of events. An event e consists of one or more control parameters c1, c2, . . . , cn, plus an optional payload p, which is written as e=<c1, c2, . . . , cn; p>. A payload will typically be a relational tuple (i.e., an ordered sequence of data values), but might be something else, such as a punctuation pattern. The technique utilizes a notion of conformance of a payload p to a schema RR. In other words, a stream R conforms to schema RR if the payload of every event in R conforms to RR.

The exact nature of control parameters varies from system to system. Some of the alternative implementations can include a single control parameter that contains a sequence number assigned at the inputs to a query. Another example can include a control parameter that indicates what the event represents (regular tuple, punctuation, end of stream), and a second control parameter giving a timestamp supplied by the stream source. Another example can include a control parameter indicating whether the event represents a positive tuple (insertion) or negative tuple (deletion). Still a further example can include a pair of control parameters defining a time interval over which the payload is valid.

The present implementations do not constrain the details of the control parameters. Instead, some implementations require that for stream R(RR), any prefix P of R can be reconstituted into a linear sequence r1, r2, . . . , rm of snapshots over RR. Each snapshot is just a finite relation over RR. It is useful to think of how each additional event modifies the reconstitution. For example, with the first alternative described above, the technique can treat an event <sn, p> as adding a new snapshot to the list that adds p to the previous snapshot. That is, it extends r1, r2, . . . , rsn−1 to r1, r2, . . . , rsn−1, rsn, where rsn=rsn−1∪{p}. For the final alternative offered above, the technique can view snapshots being indexed by timestamps, and an event <s, e; p> as inserting p into any snapshot rtk in rt1, rt2, . . . , rtm where s≤tk<e, plus possibly adding a snapshot re to the end of the list if e>tm.

Some implementations can treat a stream R as representing a potentially infinite list r1, r2, . . . that is the limit for the reconstitution as the technique takes longer and longer prefixes of R. This sequence can be thought of as the canonical history of R, and consider the intent of applying a function f to R to be a stream S whose canonical history is f(r1), f(r2), . . . . However, there is no guarantee that R converges to a well defined canonical history in the limit. New events might continue to update a particular snapshot indefinitely. Thus, some implementations can require that a stream make progress, meaning that for each snapshot ri, there comes a point in the stream where ri no longer changes.

For an event e in stream R, let P be the prefix of R up to e, and P:e be P with the addition of e. Let the reconstitution of P be r1, r2, . . . , rm, and the reconstitution of P:e be s1, s2, . . . , sn. Then define the stabilization point of e relative to R, stable(e), as the maximum i such that:

$$r_1=s_1, r_2=s_2, \ldots, r_i=s_i.$$

That is, e does not modify any of r1, r2, . . . , ri. It can be considered that stream R progresses if for any index j, there is a point after which for any event e, stable(e)≥j. At that point, snapshot rj is stabilized—it will no longer change. If R progresses, then every snapshot eventually stabilizes, and the canonical history is well defined. In this case, the technique can use R@i to denote snapshot ri in the canonical history of R.

Note that snapshots in a reconstitution or canonical history need not be indexed by sequential integers. Any strictly increasing sequence can work and some implementations can use timestamps in the sequel.

The above discussion considers only progressing streams, so that the canonical history is always defined. However, at least some of the implementations can detect progress and then make use of it. For some streams, this task is easy—for example, in the first alternative offered above, if events are assumed to be in order of increasing sequence number, then one approach entails handling disordered streams (at least in the recursive part of the query). This approach can utilize a form of punctuation to explicitly mark progress. An event e in stream R constitutes a punctuation at i if every event d after e in R has stable(d)>i. Then it can be stated that stream R explicitly progresses if for any index j, there is some event e in R that is punctuation at i, where i>j. In some cases, such as ordered streams, "normal" events can serve as punctuations. However, to handle disordered streams, these implementations can utilize specific punctuation events (flagged as such with a control parameter). It can be assumed that stream operators produce explicitly progressing output given explicitly progressing inputs. Thus, the stream operator can propagate punctuation appropriately.

The above definition of FFP operator 212(6) can also have speculative punctuation, which is similar to regular punctuation, but does not actually guarantee stream progress. The following discussion will refer to non-speculative punctuation as definite punctuation for purposes of distinguishing the two. The discussion below uses dp(i) to denote a definite punctuation event at index i, and sp(i) to denote a speculative punctuation event at index i.

CEDR Implementation

The following discussion relates to an implementation that leverages complex event detection and response (CEDR) technologies. A brief introduction to CEDR technologies follows.

Conventional stream systems separate the notion of application time and system time, where application time is the clock that event providers use to timestamp tuples created by the providers, and system time is the clock of the receiving stream processor. The disclosed architecture, referred to throughout in this description as the CEDR system, further refines application time into occurrence time and valid time, thereby providing a tri-temporal model of occurrence time, valid time, and system time.

A temporal stream model is used to characterize streams, engine operator semantics, and consistency levels for handling out-of-order or invalidated data. In one implementation, the tri-temporal model is employed. The temporal model employed herein, however, is simplified in the sense of modeling valid time and system time (occurrence time is omitted). For the purposes of this description, this is sufficient, since only these two notions of time are necessary to understand the disclosed speculative output and consistency levels.

A CEDR data stream is modeled as a time varying relation. For most operators, an interpretation is used that a data stream models a series of updates on the history of a table, in contrast to conventional work which models the physical table updates themselves. In CEDR, a stream is modeled as an append-only relation. Each tuple in the relation is an event, and has a logical ID and a payload. Each tuple also has a validity interval, which indicates the range of time when the payload is in the underlying table. Similar to the convention in temporal databases, the interval is closed at the beginning, and open at the end. Valid start and end times are denoted as Vs and Ve, respectively. When an event arrives at a CEDR stream processing system, its CEDR (or system) time, denoted as C, is assigned by the system clock. Since, in general, CEDR systems use different clocks from event providers, valid time and CEDR time are not assumed to be comparable.

CEDR has the ability to introduce the history of new payloads with insert events. Since these insert events model the history of the associated payload, both valid start and valid end times are provided. In addition, CEDR streams can also shrink the lifetime of payloads using retraction events. These retractions can reduce the associated valid end times, but are not permitted to change the associated valid start times. Retraction events provide new valid end times, and are uniquely associated with the payloads whose lifetimes are being reduced. A full retraction is a retraction where the new valid end time is equal to the valid start time. Further details about CEDR technologies can be obtained from U.S. patent application Ser. No. 11/937,118, filed on Nov. 8, 2007, the contents of which are hereby incorporated by reference in their entirety.

In some CEDR implementations, there are four control parameters, EventType, VStart, VEnd, and VNewEnd. Snapshots in CEDR are indexed by timestamps. The EventType can be Insert, Retract, CTI or EOS. For Insert, VStart and VEnd indicate the range of snapshot indices over which the payload is valid. That is, the payload belongs to all snapshots in that range. Note that the interval is closed at the beginning and open at the end, so the payload is not in the snapshot associated with VEnd. For Retract, all of VStart, VEnd and the payload should match a previously seen event e, and VNewEnd, where VStart≤VNewEnd<VEnd, effectively specifies a new VEnd for e. A Retract removes its payload from snapshots with indices equal or later than VNewEnd. In terms of progress, if e is an Insert event, stable(e)=VStart. If e is a Retract, then stable(e)=VNewEnd. A CTI (current time increment) event is a (definite) punctuation at index VStart. EOS stands for "End of Stream", and is only issued if a stream is ceasing output.

Queries and Fixed Points

To accommodate the algebraic representation of queries with FFP operators, the present techniques can view a relational query Q over which a fixed point can be computed as having two relational parameters, r and s, designated as Q(r, s). Parameter r can name an external input (and can be generalized to a set of relations). Parameter s can name the recursion parameter, which represents data headed around the recursive loop. Some implementations can require that schema(Q)=schema(s), and that Q is monotone on its second argument. This can be represented as $Q(r, s) \subseteq Q(r, s \cup s1)$ for any s1.

The technique can now define the fixed point of Q on r. Let $$Q_0(r)=Q(r,\emptyset)$$

$$Q^i(r)=Q(r,Q^{i-1}(r)) \text{ for } i>0$$

The technique can specify that tuple t has level i if it appears in Qi(r). The fixed point of Q on r is $$Q^*(r)=U_{0 \leq i} Q^i(r).$$

One potential goal for recursive queries over a stream R is to compute the fixed point of each snapshot in the canonical history of R. That is, given progressing stream R and Query Q, it can be desirable to produce a progressing stream S such that, for every index i, $$S@i=Q^*(R@i).$$

An S that satisfies these conditions is called a fixed-point stream for R under Q, and write S∈Q*(R). (This membership is utilized because there could be many streams with this property.)

As noted in the introduction, it can be desirable to avoid certain kinds of divergent behavior in computing fixed points. The need for finite answers and finite derivations are captured in the following two definitions.

Definition: Query Q(r, s) is convergent if for each value of r, there exists a k such that Qk(r)=Qk+1(r).

If Q(r, s) converges at k, then $$Q^*(r)=U_{0 \leq i \leq k} Q^i(r).$$

This shows that the result of Q on any value of r is finite.

Definition: Query Q(r, s) is strongly convergent if for each value of r, there exists a k such that Qk(r)=∅.

Note that strongly convergent implies convergent, and that for a strongly convergent query Q, there is a maximum level (k) that any tuple t in Q*(r) has, hence the number of derivations is finite.

Operations

Expressing Q with appropriate algebraic operators can allow FFP operators to be used with a target query Q(r, s). The algebraic operators are appropriate if they express Q with algebraic operators such that they behave appropriately with regard to speculative punctuation. A streaming operator G can be considered to be speculation-friendly if the following three conditions hold.

First, G speculates correctly.

Second, G does not block on definite punctuation.

Third, G is forward moving.

These conditions are discussed below.

In relation to the first condition, G speculates correctly if given a speculative punctuation sp(i) in one input stream, and that every other input stream is explicitly progressing, G will eventually emit speculative punctuation sp(j) where j≤i. Moreover, if it turns out that sp(i) actually holds (that is, G receives no later event e with stable(e)≤i), then sp(j) actually holds (G will emit no event d with stable(d)≤j). Also, if G has previously emitted a definite punctuation dp(k), then j≥min(i, k). This last condition says that G doesn't "back up" from previously emitted definite punctuation. In practice, it will always turn out that i>k, so j>k.

In one instance, to speculate correctly, G will typically track definite punctuation on its other inputs. In this implementation i=j. However, an alternative implementation (termed the probing approach) is described below where j is sometimes less than i.

In relation to the second condition, where G does not block on definite punctuation, G is presumed to produce explicitly progressing output on explicitly progressing input. This method further instructs operators to emit output in the absence of any particular definite punctuation. Such a G must output the same collection of non-punctuation events on any two input streams with the same non-punctuation events. Any monotonic operator has a non-blocking implementation. (Handling non-monotonic operators by being able to revise previous outputs is discussed below under the heading "FFP in CEDR").

The third condition where G is forward moving utilizes an input event e. If input event e for G contributes to output event d, then the technique specifies that stable(e)≤stable(d). In practice, it is unlikely that an operator G could arbitrarily shift events backward in time without violating the first condition.

The FFP Operator

Using the FFP operator to compute fixed points relative to a query Q(r, s), utilizes an algebraic query tree T(O, Ir, Is) for Q. O, Ir and Is are essentially "ports" of this query tree, where O connects to an output stream, Ir connects to an external input stream R, and Is will be for recursive input. The FFP operator can also be viewed as having ports: FFP(I, OE, OR). Here I connects to an input stream, OE connects to the external output stream, and OR connects to the recursive output stream. The technique can apply FFP to T and R to make the following connections:

R→$I_r$
O→I
$O_R$→$I_s$

OE will connect either directly to a client, or to the input of a downstream operator. This discussion denotes this arrangement of operators by FFP(R, T). When FFP, T and R are connected in this manner, a recursive loop is created that passes from OR to Is to O to I.

Figure 4:
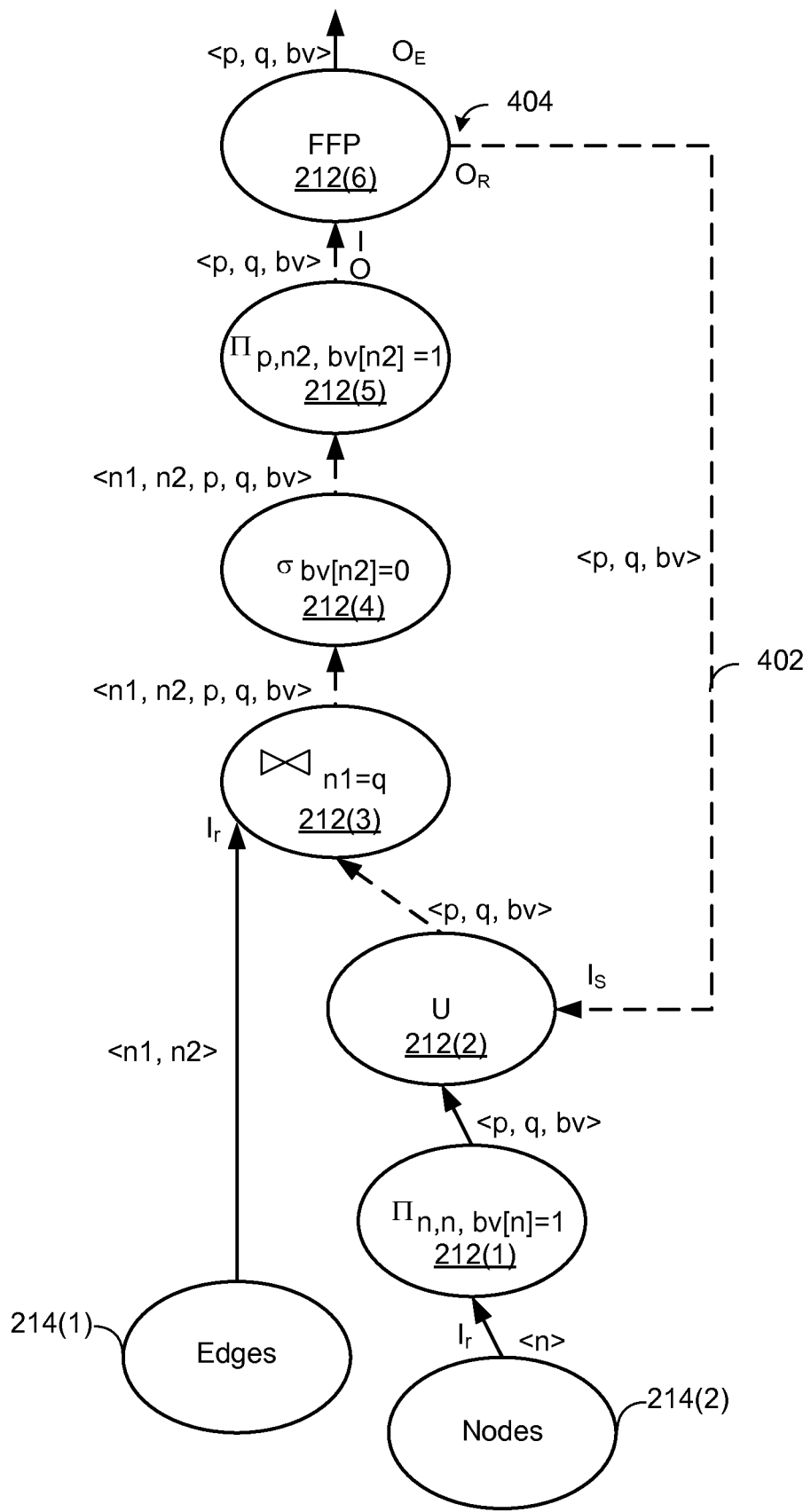

FIG. 4 shows the recursive loop in this reachability query as a dashed line 402. FIG. 4 retains the operators 212(1)-212(6) and data streams 214(1)-214(2) introduced in relation to FIG. 2 and these components will not be reintroduced here for sake of brevity. Note that for this example, Q, and hence T, has two external input streams, one for nodes and one for edges. Q can be thought of as a conceptual entity. For computation purposes, Q will be represented as a tree of operators, T. In FIG. 4, T can consist of the operators 212(1)-212(5), but not 212(6), which is the FFP operator.

In defining the FFP operator 212(6), this technique views the FFP operator as operating in phases, iterating over segments of its input separated by speculative punctuations. (These phases in general will be different from the levels of recursion defined earlier.) The discussion assumes that at startup, the FFP operator 212(6) emits a speculative punctuation sp(tmin) on OR at 404, where tmin is known to be before the stable points of all events on all external input streams.

A segment of input for FFP operator 212(6) is a maximal sequence of events e1, e2, . . . , em, sp(t) received on I, where none of the ei's is a speculative punctuation. In this implementation, by maximality, e1 must either be the first event on I, or be preceded immediately by a speculative punctuation. The present techniques can allow that a segment can have e1, e2, . . . , em be the empty list.

For each segment e1, e2, . . . , em, sp(t) that the FFP operator 212(6) receives on I, it performs the following steps.

F1. Emit e1, e2, . . . , em, on output OE.

F2. Emit those events in e1, e2, . . . , em that are not definite punctuations on output OR.

F3.a. If stable($e_i$)>t for 1≤i≤k, then emit dp(t) on output $O_R$, followed by sp(u) for some u≥t+c (for a fixed constant c).

F3.b. Otherwise, emit sp(t) on output $O_R$.

The constant c can be chosen as the minimal possible time interval, sometimes called a chronon. Note that FFP operator 212(6) may only ever have one speculative punctuation circulating on the recursive loop at a time. Its strategy is to keep circulating a speculative punctuation ps(t) until it determines that the punctuation is valid, then it converts it to a definite punctuation and starts speculating at a later point. The next section will present conditions under which such speculation must always eventually succeed.

While this definition of FFP or FFP operator might seem to indicate that it operates in a batch-oriented fashion, in fact, as seen in the reachability example and the implementation in the "FFP in CEDR" section, steps F1-F3 can be pipelined and run in a continuous fashion. Hence the "Flying" in "Flying fixed-point" operator.

Correctness of FFP

This section describes the results of the foundation introduced above.

Theorem: Let T(O, Ir, Is) be a query tree for a strongly convergent query Q(r, s). If T uses speculation-friendly operators and R is an explicitly progressing stream, then FFP(R, T) outputs an explicitly progressing stream S∈Q*(R).

A proof is provided below in two main parts. The first part establishes that S is a fixed-point stream for R under Q. The second part shows that S is explicitly progressing. This proof is provided for discussion purposes in relation to specific implementations. Other implementations can achieve recursive data stream processing without relying on the absolute assertion expressed in this proof.

That S is a fixed-point stream for R under Q does not rely on the handling of speculative punctuations at all. Rather, it follows from the fact that FFP sends all input back around the recursive loop, that operators on that loop do not block on definite punctuations, and that R is progressing. The proof of this part is an induction on the level of recursion. Consider a specific snapshot r=R@t in the canonical history of R. The general statement is that FFP eventually receives (hence outputs to OE) all events needed for Qm(r) for every m.

Basis Case

The basis case is that FFP receives Q0(r)=Q(r, Ø) on I. This case holds since R will eventually progress past t and stabilize r. Since T will have received all of Ø at this point, it will output all of Q(r, Ø) to I. (There is no problem if T receives more data, because Q is assumed monotone on its second input.)

Inductive Step

This case follows from the observation that if the FFP operator has received all of Qk−1(r) on its input I, it will emit it on recursive output OR. Thus, T will eventually produce all tuples in $Q(r,Qk-1(r))=Qk(r)$.

Since Q is strongly convergent, there is some j such that Qj(r)=Ø. Thus once FFP has received all input up through Qj(r), there will be no more output events for Q*(r), and the output of FFP will progress past time t.

Demonstrating the explicit progress of S requires two things. (1) Any dp(t) that FFP emits on OE must be correctly placed. That is, no later event e will be emitted with stable(e)<t. (2) For any index u, FFP will eventually emit a definite punctuation tp(t) for some t≥u.

For (1), it is noted that FFP will always see the end of a segment (that is, the next speculative punctuation). After FFP emits any events on OR in step F2, it will necessarily emit a speculative punctuation on OR in step F3.a or F3.b. Because every operator on the recursive loop is speculation-friendly, each must eventually pass on the speculative punctuation until it gets back to I. Now consider segment e1, e2, . . . , em, sp(t) that satisfies the if-statement in step F3.a. When e1, e2, . . . , . . . , em are sent out again on OR, any event d they will produce in the next segment will have stable(d)>t, since all operators on the recursive loop are forward moving. This situation will be true for all subsequent segments, by similar reasoning. Thus the speculative punctuation sp(t) was actually valid, and FFP can convert it safely to dp(t). Since R is explicitly progressing, T will eventually produce a definite punctuation dp(u) where u≥t. That punctuation will be correctly placed in the output of T by the properties of its operators, and hence will be correctly placed in the output of FFP.

For (2), it is noted that a speculative punctuation sp(t) can only be recirculated a finite number of times by step F3.b before step F3.a applies. Since the input of FFP progresses, as shown in the first part of the proof, there must eventually be a segment where e1, e2, . . . , em all have stable points after t. Further, each time the technique uses step F3.a, it increases the index for the speculative punctuation by at least c. Thus, the technique must eventually speculate at some index v≥u. End of Proof.

The hypotheses in the above theorem are actually stronger than they need be. Any operators in T that are not on the recursive loop do not need to be speculation-friendly. They only need to satisfy the condition that they emit explicitly progressing output on explicitly progressing input.

FFP in CEDR

Until this section, the discussion of FFP operators is framed in a way which may be applied to most streaming systems. This section discusses how recursion can work in the CEDR stream-processing system. Among the discussed topics are how speculative CTIs fit into the CEDR event model, and how specific operators respond to these new events. Also discussed is the handling of speculative output, which is a native capability of the CEDR event processing system, in recursive queries. Further, the interaction between the CEDR style of windowing and recursion is discussed. Finally, consequences in terms of the sharing of computation between windows with shared events are discussed.

Speculative CTI Handling

In the CEDR event processing system, physical streams may already contain definite punctuations called CTIs (current time increment). These punctuations come with a timestamp t. When one of these events is received by the listener, there is a guarantee that all events which affect snapshots earlier than t have been received. Operators use this guarantee to garbage collect (i.e., reclaim) state that will not affect future output. CEDR operators, except "align", do not need these events to unblock output, since they do not have to block in the first place. Rather, they can produce speculative results incorporating all the received events, and correct these results later if necessary using retractions.

Like a definite CTI, a speculative CTIs (specCTI) comes with a timestamp t. Note that in order to handle specCTIs correctly, each operator should guarantee that it is handling these events in a speculative-friendly way. Recall our definition from the "formalism" section.

G is speculation-friendly if the following three conditions hold:

S1. G speculates correctly.
S2. G does not block on definite punctuation.
S3. G is forward moving.

Some implementations guarantee these requirements in CEDR by treating the SpecCTI similarly to a definite CTI, except for two things:

First, do not garbage collect based on speculative CTIs, as the recursion might not be finished.

Second, the described strategy can require that SpecCTIs loop through the recursion unchanged. This restriction may force the SpecCTI to become lodged until another operator input catches up or until a SpecCTI may be safely emitted for the requested time.

S1 is easily upheld for unitary or unary operators. After unblocking any necessary output, thus possibly producing speculative output, the technique simply allows the SpecCTI through. Binary operators are a bit trickier. Assuming that one branch is in the recursive loop, the technique lodges the SpecCTI in the binary operator until it receives, from the non-recursive child, a definite CTI with timestamp greater than or equal to the SpecCTI timestamp. This delay ensures that all input from the non-recursive side that could influence the output states prior to the SpecCTI has been absorbed and emitted by the operator before emitting the SpecCTI. Since the technique assumes that all non-recursive inputs are explicitly progressing, a time must exist where the specCTI becomes dislodged and passes through. At this time, since specCTIs are treated, for the purpose of producing output, like definite CTIs, all speculative output up to that point in time must have been emitted.

S2 is trivially upheld by the CEDR operators, none of which block on definite punctuation except align. Rather, CEDR operators speculate as an alternative to blocking.

S3 is also trivially upheld by all operators in the CEDR algebra except AlterLifetime, which is the only operator in the algebra which can emit an event that includes valid times outside the range of the input event which generated it. Since AlterLifetime is used for windowing in the employed algebra, the technique could require that all windowing be done on inputs outside the recursive loop.

One implementation of the FFP operator augments the CEDR multicast operator to handle specCTIs. This implementation tracks the "high water mark" of the stabilization point for all Insert and Retract events, and uses this value to speculate with. Its handling of specCTIs and other events follows the algorithm given in Section 3.4, except it performs steps F1-F3 on the fly. To test the if-condition in step F3.a, it remembers the timestamp in the currently circulating specCTI, and sets a flag if it sees an earlier event before the specCTI returns. Thus, this implementation uses a fixed amount of state.

An observant reader will note that rather than allowing SpecCTIs to become lodged in an operator, some implementations can immediately emit them with the latest timestamp that their other inputs allow, which, in these cases, would be guaranteed to be less than the original SpecCTI. Rather than using a scheme with a high water mark, these techniques could instead initially emit a SpecCTI with a timestamp of infinity, and then retry the timestamp that comes back until the technique can emit a definite CTI. After emitting the definite CTI, the technique could then emit another SpecCTI at infinity, etc. This alternative approach is termed "specCTI probing".

CEDR Speculative Output

The CEDR stream processing system uses operators that inherently speculate very aggressively by issuing full or partial retractions for previous events in the input stream. Using this mechanism, operators are free to speculate as aggressively as—at any given time—producing all output under the assumption that the input received so far is all the input. Speculation may then be throttled back using the Align operator, and permanence of output may be forced by the finalize operator for the purpose of managing state in the absence of frequent-enough CTIs. Some of the described implementations of FFP can handle the Retract events that are sometimes issued by speculative operators, by virtue of starting with operator implementations that handle Retracts.

Note that this form of speculation also allows these techniques to significantly increase the expressiveness of recursive queries, which, using this form of speculation, allows the recursive use of operators such as aggregation and difference.

Windows and Incremental Evaluation

In CEDR, rather than associating windows with operators, some techniques associate windows with data. More specifically, some of these techniques can associate with every event, an interval (as opposed to other systems, which use a single timestamp). This interval is actually the time during which a particular payload, associated with the event, is in the snapshots being modeled by the stream. This treatment has the effect of assigning payloads to windows, such that the valid time interval of the event determines the output times during which a windowed version of any operator includes the payload. The AlterLifetime operator can be used to explicitly set these windows.

Example II

Pattern Matching with NFA

This section explains how the user of FFP operators can implement arbitrary NFAs, a common paradigm for implementing pattern matching. As with the above examples, these techniques get the ability to speculate, incrementally window, and handle out-of-order inputs as a consequence of using existing operators.

Figure 5:
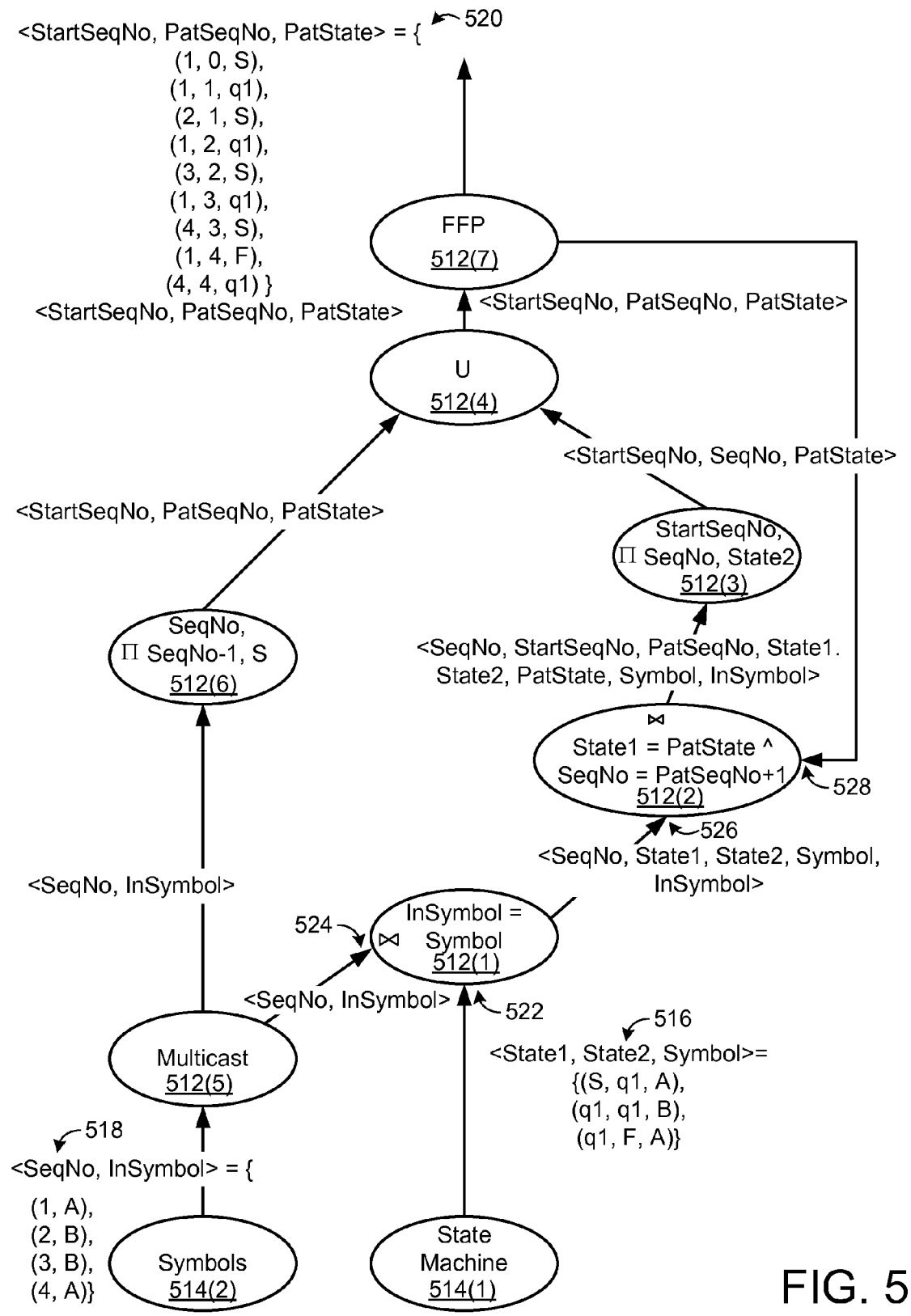

FIG. 5 shows the resulting plan in the form of query graph 510. In the present case, query graph 510 includes seven operators 512(1)-512(7). Operators 512(1) and 512(2) are join operators; operator 512(3) is a project operator; operator 512(4) is a union operator; operator 512(5) is a multicast operator; operator 512(6) is another project operator, and operator 512(7) is an FFP operator.

Two data streams serve as sample input to query graph 510; the first input stream is in the form of state machine 514(1), while the second input stream is in the form of symbols 514(2). An example of input data of the state machine 514(1) is evidenced generally at 516. An example of input data of the symbols 514(2) is evidenced generally at 518. Output from the query graph 510 is evidenced generally at 520.

Note that, rather than being compiled into the plan, the state machine is given as a streaming input, and may, in theory, change over time. Thus, the plan is actually a streaming program for executing arbitrary, evolving automata.

For clarity, as with the above examples, the discussion again assumes that the window is infinite, and explains the role of the various operators 512(1)-512(7) with the given input. The particular automata that are executed here searches for the pattern AB*A. The query can output all discovered event sequences that constitute partial and complete patterns, and their associated states in the automata. The starting state is called S, and the final state is called F. (Note that there may be multiple final states, and that one could filter the output for final states if desired.)

The state machine input 514(1) is described using a set of transitions such that each transition absorbs an accompanying input. The symbols input 514(2) is a description of the sequence in which an attempt is made to find patterns. Each event has a sequence number, and a symbol, which may match a symbol in the automata transition table.

A detailed query description was provided above in relation to the reachability example. For sake of brevity only a sketch of query behavior is provided in the present discussion. The state machine input 514(1) is loaded into a right join synopsis 522 of the lower join 512(1). When input comes along the symbols input 514(2) to left synopsis 524, join 512(1) finds all transitions which can be made using this symbol, and passes these transitions to the join 512(2) above at left synopsis 526, which looks for partial patterns which have ended in the starting state of one of the activated transitions, and which sequentially precede the new symbol. For all such matches, the technique has found a new (partial or complete) pattern, which is output and recursively inserted back into a right synopsis 528 of the upper join 512(2).

Along the left branch of the multicast above the symbols input 514(2), the technique creates a seed start state on each input symbol and recursively inserts it into the right join synopsis 528 of the upper join 512(2).

The notion of progress used to bound the computation in this example is that transitions can be followed along increasing sequence numbers. The technique is therefore bounded in the number of recursive steps at any given moment by the number of received symbols, which at any given moment, is finite.

Note that in the example given above, the input sequence is: 'ABBA'. Given that the query returns partial and complete discovered patterns, the technique should output the following patterns and their associated end sequence IDs:

'A':1, 'AB':2, 'ABB':3, 'ABBA':4, 'A':4

Note that there are actually 4 extra outputs in FIG. 5. These outputs correspond to the 4 seed patterns introduced by the left side of the multicast, and are regarded as patterns of length 0.

In summary, the above description offers systems and techniques for processing recursive streaming queries. The description further defines how query graphs utilized in the processing can be updated to specific points in time even while the recursive streaming query may remain ongoing. The above described techniques/methods and systems can be implemented on any type of networkable computing device(s) as should be recognized by the skilled artisan.

Exemplary Methods

FIG. 6 illustrates a flowchart of a method or technique 600 that is consistent with at least some implementations of the present concepts. The order in which the technique 600 is described is not intended to be construed as a limitation, and any number of the described blocks can be combined in any order to implement the technique, or an alternate technique. Furthermore, the technique can be implemented in any suitable hardware, software, firmware, or combination thereof, such that a computing device can implement the technique. In one case, the technique is stored on a computer-readable storage media as a set of instructions such that execution by a computing device causes the computing device to perform the technique.

The technique processes a recursive streaming query through a query graph at block 602. Query graphs consist of operators connected to one another via streams. Non-limiting examples of operators and potential arrangements of operators in a query graph are detailed above in relation to FIGS. 2-5.

The technique detects when output produced by executing the query graph advances to a specific point at block 604. One implementation involves circulating speculative CTIs through a recursive loop of the query graph to detect when the output has advanced to the specific point. Examples of this and other exemplary techniques are described above.

CONCLUSION

The above described concepts detail the surprising conclusion that recursive streaming query plans, through the introduction of a cycle in the query graph, is simple, highly expressive, and practical. At least some of these concepts can immediately benefit from all the capabilities of existing operators such as incremental window evaluation, disorder tolerance, and speculation.

The present concepts can be employed in implementations that are sufficiently expressive to attack both graph-walking queries and regular-expression pattern matching. In the case of pattern matching, the associated query plan is actually linear in the number of transitions of the finite automata which detects the pattern, resulting in a highly efficient algorithm. Even further expressiveness is achieved in CEDR by speculating when necessary to ensure disorder tolerance. This allows operators such as aggregation and difference to be used in recursive loops, which is useful for expressing branch and bound execution strategies.

Detecting forward time progress is relatively straightforward with the addition of speculative CTIs, which function similarly to regular CTIs. The above discussion includes two implementations; a blocking speculative-CTI strategy based on high water marks and a non-blocking version based on probing.

Although techniques, methods, devices, systems, etc., pertaining to recursive streaming query scenarios are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A method performed by at least one computing device, the method comprising:
   using multiple operators of an operator graph for processing at least one input stream associated with a recursive streaming query, the at least one input stream comprising events having associated timestamps, the events including first events having first timestamps and second events having second timestamps that are subsequent to the first timestamps;
   performing recursive computations of the recursive streaming query on the events of the at least one input stream while advancing processing time for the recursive streaming query through multiple time increments based on the timestamps of the events;
   determining a specific time increment when the recursive computations have been completed for the first events;
   continuing the recursive computations on the second events while advancing the processing past the specific time increment; and
   using an individual operator of the operator graph to generate a multicast output from the at least one input stream while the recursive computations are continued on the second events, the multicast output comprising a recursive portion directed to another operator of the operator graph to form a recursive loop and a non-recursive portion comprising a processing output reflecting the processing on at least the first events.

2. The method of claim 1, wherein the processing comprises processing two input streams.

3. The method of claim 1, wherein the processing comprises introducing speculative time events to determine the specific time increment.

4. The method of claim 1, wherein the multicast output includes information about the advancing.

5. The method of claim 1, further comprising generating another event that contains time information associated with the advancing.

6. The method of claim 1, wherein the timestamps specify times when the events become valid.

7. The method of claim 1, wherein the timestamps specify time intervals during which the events are valid.

8. A system, comprising:
   a first networked stream operator that is included in an operator graph comprising a plurality of networked stream operators, wherein the first networked stream operator is configured to:
      receive an input stream of a recursive streaming query;
      generate a multicast output from the received input stream, the multicast output comprising a non-recursive portion and a recursive portion;
      direct the recursive portion of the multicast output back as an input to a descendant operator of the first networked stream operator in the operator graph, thereby forming a recursive loop;
      detect a specific point in the recursive streaming query that indicates that recursive computations on the received input stream are complete up to the specific point; and
      complete processing of the recursive loop when the specific point is detected; and
   a computing device configured to process the recursive streaming query using at least the first networked stream operator.

9. The system according to claim 8, further comprising:
   at least one other networked stream operator from the plurality of networked stream operators.

10. The system according to claim 8, further comprising: the descendant operator.

11. The system according to claim 10, further comprising: the operator graph.

12. The system according to claim 11, wherein the descendant operator comprises a union operator.

13. The system according to claim 11, wherein there is at least one networked stream operator in the operator graph between the first networked stream operator and the descendant operator.

14. A method performed by at least one computing device for processing a recursive streaming query with a first networked stream operator, the method comprising:
   receiving an input stream of the recursive streaming query;
   generating a multicast output from the received input stream of the recursive streaming query, the multicast output comprising a non-recursive portion and a recursive portion;
   directing the recursive portion of the multicast output as an input to a descendant operator of the first networked stream operator in an operator graph to form a recursive loop in the operator graph;
   detecting a specific point in the recursive streaming query that indicates that recursive computations on the received input stream are complete up to the specific point; and
   completing the processing of the recursive loop when the specific point is detected.

15. The method according to claim 14, performed on at least two input streams.

16. The method according to claim 15, wherein a first one of the at least two input streams comprises multiple events.

17. The method according to claim 16, further comprising:
   emitting each of the multiple events on the non-recursive portion of the multicast output; and
   emitting a subset of the multiple events on the recursive portion of the multicast output.

18. The method according to claim 14, further comprising:
   detecting the specific point by continuously circulating a speculative punctuation on the recursive portion of the multicast output until the speculative punctuation is valid; and when the speculative punctuation is valid, converting the speculative punctuation to a definite punctuation and circulating a second speculative punctuation at a later point in the recursive streaming query.

19. The method according to claim 18, the definite punctuation guaranteeing progress of processing the recursive streaming query and the speculative punctuation not guaranteeing the progress.

20. The method according to claim 14, the first networked stream operator comprising a flying fixed-point operator having an input port, a recursive output stream port, and an external output stream port, wherein the input stream is received via the input port, the recursive portion is output by the recursive output stream port, and the non-recursive portion is output by the external output stream port.

* * * * *